(12) United States Patent
Nakazato

(10) Patent No.: US 7,840,364 B2
(45) Date of Patent: Nov. 23, 2010

(54) SHORT-CIRCUIT DETECTION CIRCUIT, RESOLVER-DIGITAL CONVERTER, AND DIGITAL ANGLE DETECTION APPARATUS

(75) Inventor: Kenichi Nakazato, Tokyo (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 398 days.

(21) Appl. No.: 12/004,232

(22) Filed: Dec. 19, 2007

(65) Prior Publication Data

US 2008/0172202 A1 Jul. 17, 2008

(30) Foreign Application Priority Data

Jan. 4, 2007  (JP)  ............... 2007-000118

(51) Int. Cl.
*G01R 31/00* (2006.01)
(52) U.S. Cl. ............... 702/58; 702/79; 702/115; 324/772
(58) Field of Classification Search ............. 702/57–59, 702/64–66, 72, 79, 115; 324/234, 500, 509–511, 324/523, 772, 610; 361/42; 318/490, 432
See application file for complete search history.

(56) References Cited

U.S. PATENT DOCUMENTS

| 4,682,090 A * | 7/1987 | Schmidt et al. ............. 318/661 |
| 2001/0054911 A1 * | 12/2001 | Kobayashi et al. .......... 324/772 |
| 2003/0164711 A1 * | 9/2003 | Ishida ........................ 324/610 |

FOREIGN PATENT DOCUMENTS

| EP | 1 548 411 | 6/2005 |
| JP | 04-096690 | 3/1992 |
| JP | 07-235868 | 9/1995 |
| JP | 08-070503 | 3/1996 |
| JP | 2005-024493 | 1/2005 |
| JP | 2005-181186 | 7/2005 |
| JP | 2005-337893 | 12/2005 |
| JP | 2007-206018 | 8/2007 |

OTHER PUBLICATIONS

First Office Action, filed Nov. 25, 2008, Kenichi Nakazato.
Extended European Search Report issued Sep. 9, 2009 for corresponding European patent application No. 08000075.5.

* cited by examiner

*Primary Examiner*—Manuel L Barbee
(74) *Attorney, Agent, or Firm*—David N. Lathrop

(57) ABSTRACT

Potentials at both ends of an exciter coil to which an exciting signal is sent by a push-pull method are compared, and at least one of a short circuit to ground and a short circuit to a power supply of a signal line for the exciting signal is detected based on the duty cycle of a rectangular-wave signal indicating the result of comparison. Alternatively, a predetermined reference potential is compared with a potential of at least one of two phase detection signals before detection, and at least one of a short circuit to the ground and a short circuit to the power supply of a signal line for the at least one of the detection signals is detected based on the duty cycle of a rectangular-wave signal indicating the result of comparison.

13 Claims, 9 Drawing Sheets

SHORT-CIRCUIT DETECTION CIRCUIT, RESOLVER-DIGITAL CONVERTER, AND DIGITAL ANGLE DETECTION APPARATUS

BACKGROUND OF THE INVENTION

1. Field of the Invention

The present invention relates to short-circuit detection circuits for detecting a short circuit of a signal line connected to a resolver and to resolver-digital converters having the short-circuit detection circuits.

2. Description of the Related Art

Resolvers are one type of sensors for detecting an angle. Resolvers include an exciter coil to which an exciting signal is sent and two detection coils for outputting two detection signals respectively, namely, sine-phase and cosine-phase signals, electromagnetically induced by the exciter coil; and outputs the two detection signals as signals indicating the rotation angle of the rotor. Either the exciter coil or the detection coils are fixed to the rotor and the other is located in the stator. The two detection signals output from the resolver are input to a resolver-digital (RD) converter, and the RD converter uses a tracking loop to calculate a digital value of the rotation angle of the rotor (the rotation angle of the rotor with respect to the stator).

The resolvers malfunction when a signal line connected thereto is short-circuited to the power supply (hereinafter called a short-circuit to power) or is short-circuited to the ground (hereinafter called a short circuit to ground). Japanese Patent Application Laid Open No. 2005-181186 discloses a method for detecting such a short circuit to power or to ground in a resolver. In this method, a short circuit to power or to ground is detected when each of the sums of squares of the sine-phase signal and the cosine-phase signal output from the resolver in response to an exciting signal sent to the resolver is smaller than a predetermined value.

Japanese Patent Application Laid Open No. 2005-24493 discloses a method for detecting a malfunction of a resolver based on a sine-wave signal or a cosine-wave signal obtained by detecting (operating to extract the envelope of a waveform) the output signal of the resolver. In this method, at lease one of the sine-wave signal and the cosine-wave signal is compared with a predetermined threshold to output a resultant rectangular-wave signal, and a malfunction of the resolver is detected according to the duty cycle or the period of the rectangular-wave signal.

The method disclosed in Japanese Patent Application Laid Open No. 2005-181186 cannot determine whether a short circuit has occurred in the signal lines for sending an exciting signal to the resolver or a short circuit has occurred in the signal lines for outputting the detection signals from the resolver. In addition, it cannot be determined whether the detected short circuit is a short circuit to power or to ground. As a result, it is difficult to find a portion causing the malfunction, and therefore, it is difficult to repair the resolver. Furthermore, it is not possible to detect a short circuit only in one of the signal lines for sending an exciting signal and the signal lines for outputting the detection signals, or to detect only one of a short circuit to power and a short circuit to ground.

In addition, in the method disclosed in Japanese Patent Application Laid Open No. 2005-181186, the sine-phase signal and the cosine-phase signal, which are analog signals, need to be squared in order to detect a short circuit, making the circuit configuration complicated.

The detection signals output from a resolver are obtained when the exciter coil receives an exciting signal and electromagnetically excites the detection coils. Therefore, the each detection signal before detection which is an operation to extract the envelope of a waveform includes the phase component of the exciting signal and the phase component corresponding to the rotation angle of the rotor. In the method disclosed in Japanese Patent Application Laid Open No. 2005-24493, the detection signal output from the resolver is detected to extract only the phase component corresponding to the rotation angle of the rotor, and the sine-wave signal or the cosine-wave signal, which has no phase component of the exciting signal, is used for detecting a malfunction of the resolver. Therefore, this method can only be applied to a case where the rotor of the resolver rotates in a regular manner. More specifically, with this method, a malfunction of the resolver cannot be detected if the rotor rotates in an irregular manner or if the rotor stops.

SUMMARY OF THE INVENTION

According to a first aspect of the present invention, a short-circuit detection circuit for detecting a short circuit of a signal line connected to a resolver in which an exciting signal is sent to an exciter coil and two detection signals of sine-phase and cosine-phase electromagnetically induced in two detection coils are output includes an exciting-line malfunction detection circuit for comparing potentials at both ends of the exciter coil to which the exciting signal is sent by a push-pull method; for detecting at least one of a short circuit to ground and a short circuit to a power supply of a signal line for the exciting signal based on the duty cycle of an exciting pulse signal that is a rectangular-wave indicating the result of comparison; and for outputting an exciting-line malfunction detection signal indicating the result of detection.

According to a second aspect of the present invention, a short-circuit detection circuit for detecting a short circuit of a signal line connected to a resolver in which an exciting signal is sent to an exciter coil and two detection signals of sine-phase and cosine-phase electromagnetically induced in two detection coils are output includes a detection-line malfunction detection circuit for comparing a predetermined reference potential with at least one of the two detection signals to which detection, which is an operation to extract the envelope of a waveform, is not applied; for detecting at least one of a short circuit to ground and a short circuit to a power supply of a signal line for the at least one of the detection signals based on the duty cycle of a detection pulse signal that is a rectangular-wave indicating the result of comparison; and for outputting a detection-line malfunction detection signal indicating the result of detection.

DETAILED DESCRIPTION OF THE PREFERRED EMBODIMENT

Figure 1:
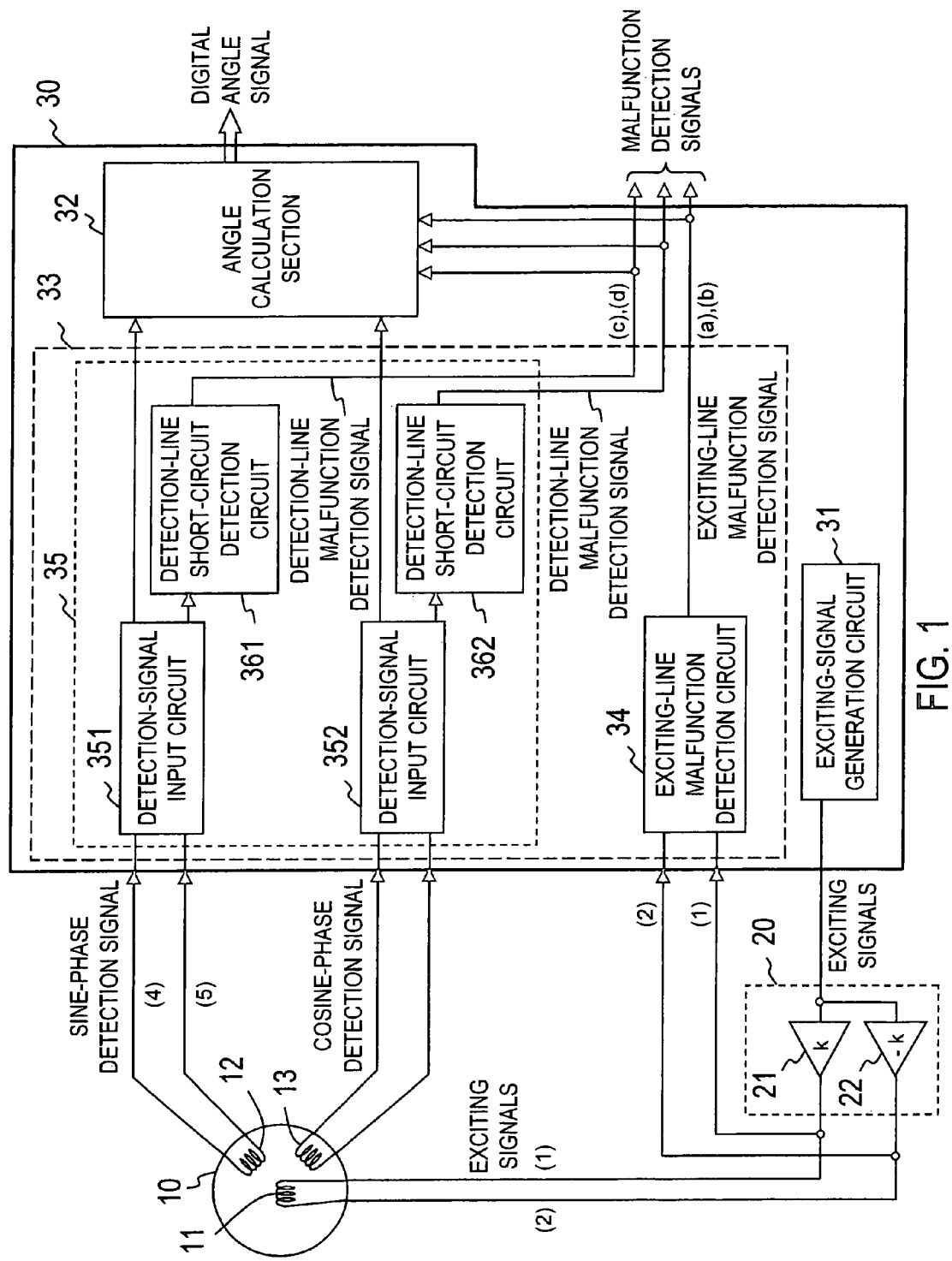
FIG. 1 is a block diagram showing example relationships between a resolver-digital converter, a current buffer, and a resolver.

A preferred embodiment of the present invention will be described below.

<Principle of the Present Invention>

The principle of the present embodiment will be described first.

A short-circuit detection circuit according to the embodiment detects a short circuit of a signal line connected to a resolver in which an exciting signal is sent to an exciter coil and two detection signals of sine-phase and cosine-phase electromagnetically induced in two detection coils are output. The short-circuit detection circuit includes an exciting-line malfunction detection circuit and a detection-line malfunction detection circuit.

The exciting-line malfunction detection circuit of the present embodiment is configured such that it compares potentials at both ends of the exciter coil to which the exciting signal is sent by a push-pull method; detects at least one of a short circuit to the ground and a short circuit to a power supply of a signal line for the exciting signal based on the duty cycle of a exciting pulse signal that is a rectangular-wave indicating the result of comparison; and outputs an exciting-line malfunction detection signal indicating the result of detection. The detection-line malfunction detection circuit of the present embodiment is configured such that it compares a predetermined reference potential with a potential of at least one of the two detection signals to which detection, which is an operation to extract the envelope of a waveform, is not applied; detects at least one of a short circuit to the ground and a short circuit to the power supply of a signal line for the at least one of the detection signals based on the duty cycle of a detection pulse signal that is a rectangular-wave indicating the result of comparison; and outputs a detection-line malfunction detection signal indicating the result of detection.

When the exciting signal is sent to the exciter coil by the push-pull method, if no short circuit to the ground or to the power supply occurs for the signal lines that send the exciting signal to the exciter coil, the potentials at both ends of the exciter coil have opposite phases from each other. In that case, the duty cycle of the exciting pulse signal indicating the result of comparison between the potentials at both ends of the exciter coil ideally has a constant value (50%, for example). If a short circuit occurs in the signal lines that send the exciting signal to the exciter coil, the duty cycle of the exciting pulse signal changes depending on which of the signal lines is short-circuited and whether a short circuit to the ground or to the power supply occurs. In the present embodiment, by using a change in the duty cycle of the exciting pulse signal, at least one of a short circuit to the ground and a short circuit to the power supply of the signal lines that send the exciting signal to the exciter coil is detected (details will be described later). "Sending the exciting signal to the exciter coil by the push-pull method" means sending exciting signals having phases differing by 180 degrees from each other to one end and the other end of the exciter coil, respectively (details will be given later).

When no short circuit to the ground or to the power supply occurs for the signal lines that send each detection signal, the duty cycle of the detection pulse signal indicating the result of comparison between the predetermined reference potential and the potential of the detection signal before detection ideally has a constant value. If a short circuit to the ground or to the power supply occurs in the signal lines that send each detection signal, the duty cycle of the detection pulse signal changes depending on which of the signal lines is short-circuited and whether a short circuit to the ground or to the power supply occurs. In the present embodiment, by using a change in the duty cycle of the detection pulse signal, at least one of a short circuit to the ground and a short circuit to the power supply of the signal lines that send each detection signal is detected (details will be described later).

Since the potentials at both ends of the exciter coil and the detection signals, which are analog signals, are converted to the rectangular-wave exciting pulse signal and the rectangular-wave detection pulse signal to detect a short circuit in the present embodiment, a simplified circuit configuration can be used compared with the case disclosed in Japanese Patent Application Laid-Open No. 2005-181186, where a sine-phase signal and a cosine-phase signal, which are analog signals, need to be squared to detect a short circuit.

Unlike in Japanese Patent Application Laid-Open No. 2005-24493, the potential of the detection signal before detection which is an operation to extract the envelope of a waveform is compared with the predetermined reference potential to generate the detection pulse signal in the present embodiment. In other words, the detection signal used in the processing in the present embodiment includes the phase component of the exciting signal sent to the resolver and the phase component corresponding to the rotation of the rotor of the resolver. Therefore, even when the rotor of the resolver does not rotate in a regular manner, a short circuit of the signal lines for the detection signal can be detected based on the duty cycle of the detection pulse signal.

The exciting-line malfunction detection circuit of the present embodiment includes, for example, a comparator for comparing the potentials at both ends of the exciter coil to generate the exciting pulse signal and for outputting the generated exciting pulse signal; a duty-cycle detection section for receiving the exciting pulse signal and for extracting and outputting a value corresponding to the duty cycle of the exciting pulse signal; and a threshold comparison section for receiving the value corresponding to the duty cycle of the exciting pulse signal, for comparing the value corresponding to the duty cycle of the exciting pulse signal with at least one of a value corresponding to a predetermined lower limit and a value corresponding to a predetermined upper limit to detect at least one of a short circuit to the ground and a short circuit to the power supply of the signal line for each exciting signal, and for outputting the exciting-line malfunction detection signal.

In that case, since the value corresponding to the duty cycle of the exciting pulse signal is compared with at least one of the value corresponding to the predetermined lower limit and the value corresponding to the predetermined upper limit to detect at least one of a short circuit to the ground and a short circuit to the power supply of the signal line for each exciting signal, even if the signal line for each exciting signal is short-circuited to the ground or to the power supply via some resistance, that short circuit can be detected.

The detection-line malfunction detection circuit of the present embodiment includes, for example, a differential amplifier of which an inverting input terminal is connected to one end of either of the two detection coils and a non-inverting input terminal is connected to the other end of the detection coil and which amplifies a potential difference between the inverting input terminal and the non-inverting input terminal, with a predetermined intermediate potential being used as a reference, and outputs the amplified potential difference; a comparator for comparing a potential at the non-inverting input terminal of the differential amplifier with the reference potential to generate the detection pulse signal and for outputting the generated detection pulse signal; a duty-cycle detection section for receiving the detection pulse signal and for extracting and outputting a value corresponding to the duty cycle of the detection pulse signal; and a threshold comparison section for receiving the value corresponding to the duty cycle of the detection pulse signal, for comparing the value corresponding to the duty cycle of the detection pulse signal with at least one of a value corresponding to a predetermined lower limit and a value corresponding to a predetermined upper limit to detect at least one of a short circuit to the ground and a short circuit to the power supply of the signal line for the at least one of the detection signals, and for outputting the detection-line malfunction detection signal.

The amount of change in the duty cycle of the detection pulse signal, obtained when a short circuit to the ground or to the power supply occurs in a signal line for each detection signal, depends on the structure of the resolver and the configuration of the detection-line malfunction detection circuit (details will be described later). When the value corresponding to the duty cycle of the detection pulse signal is compared with at least one of the value corresponding to the predetermined lower limit and the value corresponding to the predetermined upper limit to detect at least one of a short circuit to the ground and a short circuit to the power supply of the signal line for each detection signal, a change in the duty cycle of the detection pulse signal, obtained at a short circuit and depending on the structure of the resolver and the configuration of the detection-line malfunction detection circuit can be appropriately detected.

The reference potential in the present embodiment is, for example, equal to or larger than the minimum potential at the non-inverting input terminal of the differential amplifier and smaller than the intermediate potential, or is larger than the intermediate potential and equal to or smaller than the maximum potential at the non-inverting input terminal of the differential amplifier.

When the reference potential equals the intermediate potential, if the rotation angle of the rotor of the resolver is a predetermined angle, the potential of the non-inverting input terminal of the differential amplifier becomes equal to the reference potential for all phases of the exciting signal (details will be given later). In that case, the output of the comparator that generates the detection pulse signal cannot be determined, and therefore, the detection pulse signal cannot be used. When the reference potential is made different from the intermediate potential, the potential of the non-inverting input terminal of the differential amplifier becomes different from the reference potential at least at a phase of the exciting signal. As a result, a case where the detection pulse signal cannot be used because the output of the comparator cannot be determined for all phases of the exciting signal can be avoided.

For example, the following expressions are satisfied in the present embodiment:

$$1/2 > Dy(\min) > 1/2 - (1/\pi)\sin^{-1}[\{Vc/(BK)\}\{G(1+K)-1\}]$$

where Vc indicates the intermediate potential, G indicates a constant, GVc indicates the reference potential, K indicates the gain of the differential amplifier, B indicates, when the one end of the detection coil, connected to the inverting input terminal, is short-circuited to the ground, the amplitude of the potential at the other end of the detection coil, and Dy(min) indicates the lower limit; and $$1/2 < Dy(\max) < 1/2 - (1/\pi)\sin^{-1}[\{Vc/(AK)\}\{G(1+K)-1\}-(Vp/A)]$$

where A indicates the amplitude of the potential at the one end of the detection coil when the other end of the detection coil, connected to the non-inverting input terminal, is short-circuited to the power supply, Vp indicates the potential of the power supply, and Dy(max) indicates the upper limit.

When the parameters are specified to satisfy the above-described relationships, the detection pulse signal obtained when a short circuit to the ground or to the power supply occurs at any of both ends of each detection coil never falls in the range between the lower limit (inclusive) and the upper limit (inclusive). Therefore, a case where the detection pulse signal falls in the range between the lower limit (inclusive) and the upper limit (inclusive) even if a short circuit to the ground or to the power supply occurs, resulting in the inability to detect the short circuit, can be avoided.

As described above, with a simple circuit configuration, a short circuit of each signal line connected to the resolver can be detected and/or a short circuit to the ground and a short circuit to the power supply can be detected separately in the present embodiment. In addition, a short circuit can be detected when the rotor is rotating in an irregular manner or when the rotor is stopped.

[Details of the Present Embodiment]

Details of the present embodiment will be described below with reference to the drawings. The configuration of the present embodiment will be described first, and then, the operation of the present embodiment will be described.

[Overall Configuration]

FIG. 1 is a block diagram showing example connection relationships between a resolver-digital (RD) converter 30, a current buffer 20, and a resolver 10 according to the present embodiment.

The resolver 10 includes an exciter coil 11 to which an exciting signal is sent and two detection coils 12 and 13 in which detection signals are electromagnetically induced. Either the exciter coil 11 or the detection coils 12 and 13 serve as a rotor and the other serves as a stator. Two detection signals, that is, a sine-phase signal and a cosine-phase signal, electromagnetically induced in the two detection coils 12 and 13 are output as signals indicating the rotation angle of the rotor.

The RD converter 30 includes an exciting-signal generation circuit 31 for generating the exciting signal sent to the resolver 10, an angle calculation section 32 for converting the detection signals to a digital angle signal, and a short-circuit detection circuit 33 for detecting a short circuit of signal lines connected to the resolver 10. The short-circuit detection circuit 33 includes an exciting-line malfunction detection circuit 34 for detecting a short circuit of signal lines used for sending the exciting signal to the resolver 10, and a detection-line malfunction detection circuit 35 for detecting a short circuit of signal lines used for sending the detection signals output from the resolver 10 to the RD converter 30. The detection-line malfunction detection circuit 35 includes a detection-signal input circuit 351 for receiving the sine-phase detection signal generated across both ends of the detection coil 12 and for outputting a differential amplified signal, a detection-signal input circuit 352 for receiving the cosine-phase detection signal generated across both ends of the detection coil 13 and for outputting a differential amplified signal, a detection-line short-circuit detection circuit 361 for outputting a detection-line malfunction detection signal related to the sine-phase detection signal, and a detection-line short-circuit detection circuit 362 for outputting a detection-line malfunction detection signal related to the cosine-phase detection signal.

The current buffer 20 includes an amplifier 21 for non-inverting amplification having a gain k and an amplifier 22 for inverting amplification having a gain −k, and sends exciting signals to the exciter coil 11 by a push-pull method.

[Example Configuration of the Exciting-line Malfunction Detection Circuit 34]

The exciting-line malfunction detection circuit 34 compares the potentials at both ends of the exciter coil 11, where the exciting signals are sent by the push-pull method; detects, according to the duty cycle of an exciting pulse signal which is a rectangular-wave signal indicating the result of comparison, a short circuit to power and a short circuit to ground of the signal lines of the exciting signals; and outputs exciting-line malfunction detection signals indicating the result of detection.

Figure 2A:
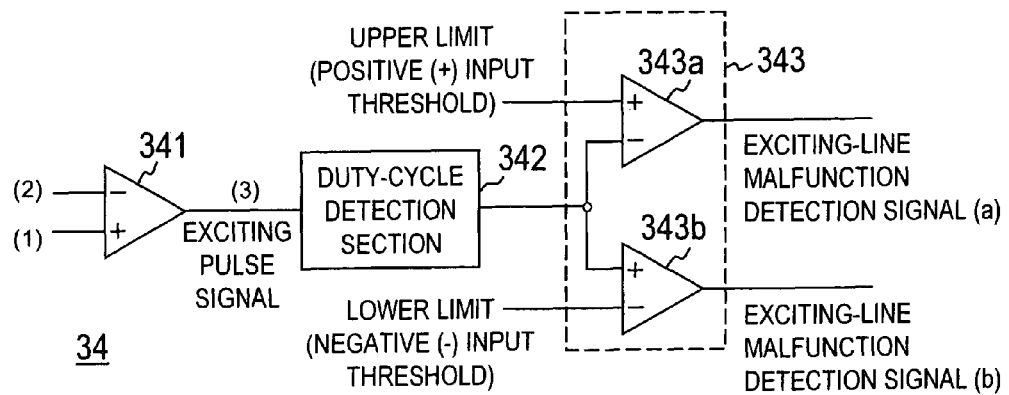
FIG. 2A is a circuit diagram showing an example configuration of an exciting-line malfunction detection circuit.

FIG. 2A is a circuit diagram showing an example configuration of the exciting-line malfunction detection circuit 34.

The exciting-line malfunction detection circuit 34 shown in FIG. 2A includes a comparator 341 for comparing the potentials at both ends of the exciter coil 11, for generating the exciting pulse signal, and for outputting the generated exciting pulse signal; a duty-cycle detection section 342 for receiving the exciting pulse signal and for extracting and outputting a value corresponding to the duty cycle of the exciting pulse signal; and a threshold comparison section 343 for receiving the value corresponding to the duty cycle of the exciting pulse signal, for comparing this value with a value corresponding to a predetermined lower limit and a value corresponding to a predetermined upper limit to detect a short circuit to ground and a short circuit to power of the signal lines of the exciting signals, and for outputting exciting-line malfunction detection signals. The threshold comparison section 343 includes a comparator 343a for comparing the value corresponding to the duty cycle of the exciting pulse signal with the value corresponding to the upper limit (positive (+) input threshold) and a comparator 343b for comparing the value corresponding to the duty cycle of the exciting pulse signal with the value corresponding to the lower limit (negative (−) input threshold).

The positive (+) input terminal of the comparator 341 is electrically connected to the output of the amplifier 21 (shown in FIG. 1) and one end of the exciter coil 11 through signal lines, and the negative (−) input terminal thereof is electrically connected to the output of the amplifier 22 and the other end of the exciter coil 11 through signal lines. The output terminal of the comparator 341 is electrically connected to the duty-cycle detection section 342. The output terminal of the duty-cycle detection section 342 is electrically connected to the negative (−) input terminal of the comparator 343a and the positive (+) input terminal of the comparator 343b. The positive (+) input terminal of the comparator 343a is electrically connected to a signal line that sends the value corresponding to the upper limit (positive (+) input threshold), and the negative (−) input terminal of the comparator 343b is electrically connected to a signal line that sends the value corresponding to the lower limit (negative (−) input threshold). The upper limit (positive (+) input threshold) and the lower limit (negative (−) input threshold) will be described later in detail. The output terminals of the comparators 343a and 343b are electrically connected to signal lines that send exciting-line malfunction detection signals (a) and (b), respectively. In this specification, positive (+) input terminals mean non-inverting input terminals and negative (−) input terminals mean inverting input terminals.

<Example Configuration of the Duty-cycle Detection Section 342>

The duty-cycle detection section 342 is formed, for example, of a low-pass filter. In that case, the value corresponding to the duty cycle of the exciting pulse signal output from the duty-cycle detection section 342 is a DC voltage proportional to the duty cycle of the exciting pulse signal. Values corresponding to the upper limit (positive (+) input threshold) and the lower limit (negative (−) input threshold), input to the comparators 343a and 343b are DC voltages proportional to the upper limit (positive (+) input threshold) and the lower limit (negative (−) input threshold) of the duty cycle.

Figure 2B:
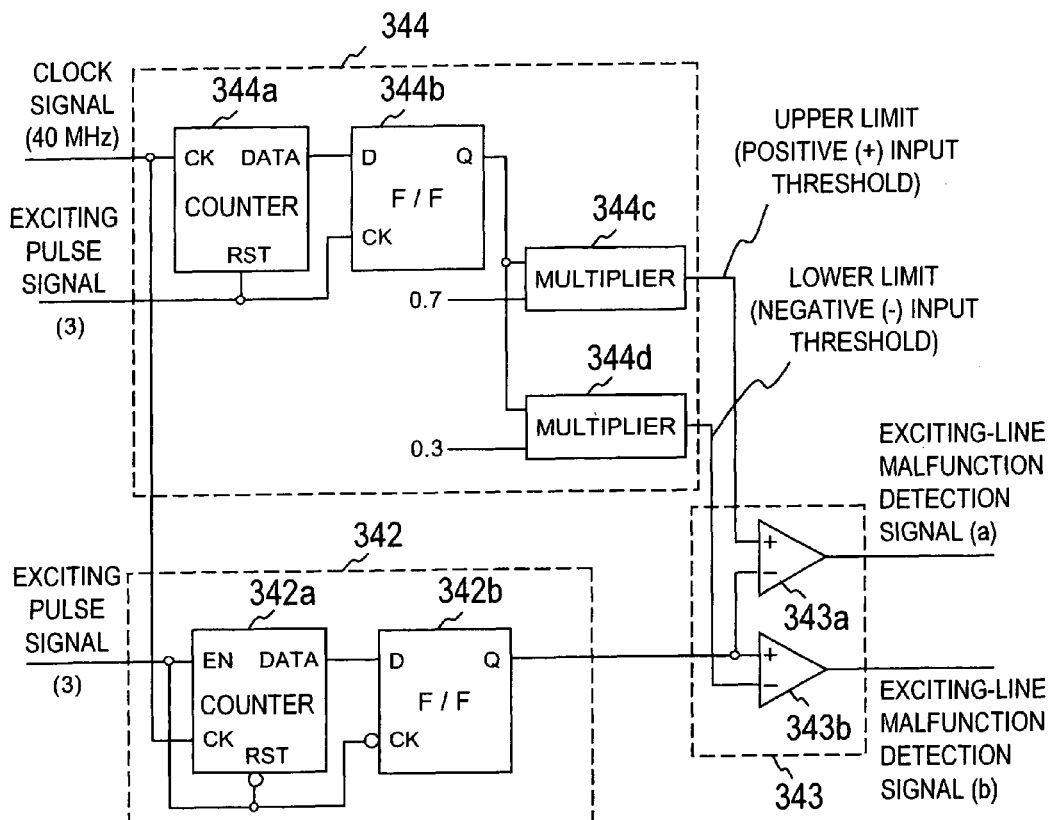
FIG. 2B is a circuit diagram showing an example duty-cycle detection section.

As another example configuration of the duty-cycle detection section 342, it is possible to use a circuit in which a clock signal is input to a counter, the clock signal is counted only when the exciting pulse signal is in a high state, and the count is output. In that case, the value corresponding to the duty cycle of the exciting pulse signal is a digital value indicating the number of clock pulses included while the exciting pulse signal is in a high state. FIG. 2B shows such an example digital circuit of the duty-cycle detection section 342.

The duty-cycle detection section 342 shown in FIG. 2B includes a counter 342a and a flip-flop (FF) 342b. The counter 342a has an EN terminal and an RST terminal, where the exciting pulse signal is input; a CK terminal, where the clock signal (having a clock frequency Fc of 40 MHz in this case) is input; and a DATA terminal, where the count is output. The FF 342b has a D terminal, where the count is input; a CK terminal, where the exciting pulse signal is input, and a Q terminal, where the level input to the D terminal is output in response to the input applied to the CK terminal.

The counter 342a counts the clock signal input to the CK terminal while the exciting pulse signal input to the EN terminal is in a high state and outputs the count from the DATA terminal. The count output from the counter 342a is reset at a falling edge of the exciting pulse signal input to the RST terminal. The count output from the DATA terminal of the counter 342a is input to the D terminal of the FF 342b. The FF 342b outputs, from the Q terminal, the level input to the D terminal at a falling edge of the exciting pulse signal input to the CK terminal. The output from the Q terminal corresponds to the number of clock pulses included in a high-state period in one cycle of the exciting pulse signal. In other words, the output P from the Q terminal can be expressed by the following expression:

$$P=(Fc/F) \times (Dy/100)$$

where Fc indicates the frequency of the clock signal in Hertz, F indicates the frequency of the exciting pulse signal in Hertz, and Dy indicates the duty cycle in percent.

Values corresponding to the upper limit (positive (+) input threshold) and the lower limit (negative (−) input threshold) for the duty-cycle detection section 342 shown in FIG. 2B are obtained by multiplying the upper limit (positive (+) input threshold) and the lower limit (negative (−) input threshold) by the number of clock pulses in one cycle of the exciting pulse signal. Such threshold values can be generated, for example, by a threshold generation section 344 shown in FIG. 2B.

The threshold generation section 344 includes a counter 344a, a flip-flop (FF) 344b, and multipliers 344c and 344d.

The counter 344a has a CK terminal, where the clock signal (having a clock frequency Fc of 40 MHz in this case) is input; an RST terminal, where the exciting pulse signal is input; and a DATA terminal, where the count is output. The FF 344b has a D terminal, where the count is input; a CK terminal, where the exciting pulse signal is input, and a Q terminal, where the level input to the D terminal is output in response to the input applied to the CK terminal.

The counter 344a counts the clock signal input to the CK terminal and outputs the count from the DATA terminal. The count output from the counter 344a is reset at a rising edge of the exciting pulse signal input to the RST terminal. The count output from the DATA terminal of the counter 344a is input to the D terminal of the FF 344b. The FF 344b outputs, from the Q terminal, the level input to the D terminal at a rising edge of the exciting pulse signal input to the CK terminal. The output from the Q terminal corresponds to the number of clock pulses (the number of pulses corresponding to a duty cycle of 100%, which is Fc/F) included in one cycle of the exciting pulse signal. The output from the Q terminal of the FF 344b is input to the multipliers 344c and 344d. The multiplier 344c further receives the upper limit (0.7 (70%) in FIG. 2B) of the duty cycle, multiplies the output from the Q terminal of the FF 344b by 0.7 and outputs the result as an upper limit (positive (+) input threshold). The multiplier 344d further receives the lower limit (0.3 (30%) in FIG. 2B) of the duty cycle, multiplies the output from the Q terminal of the FF 344b by 0.3 and outputs the result as a lower limit (negative (−) input threshold).

[Example Configuration of the Detection-line Malfunction Detection Circuit 35]

The detection-line malfunction detection circuit 35 compares the each potential of the two detection signals before detection with each predetermined reference potential; detects, according to the duty cycles of detection pulse signals which are rectangular-wave signals indicating the results of comparison, a short circuit to power and a short circuit to ground of the signal lines of the detection signals; and outputs detection-line malfunction detection signals indicating the results of detection.

Figure 3A:
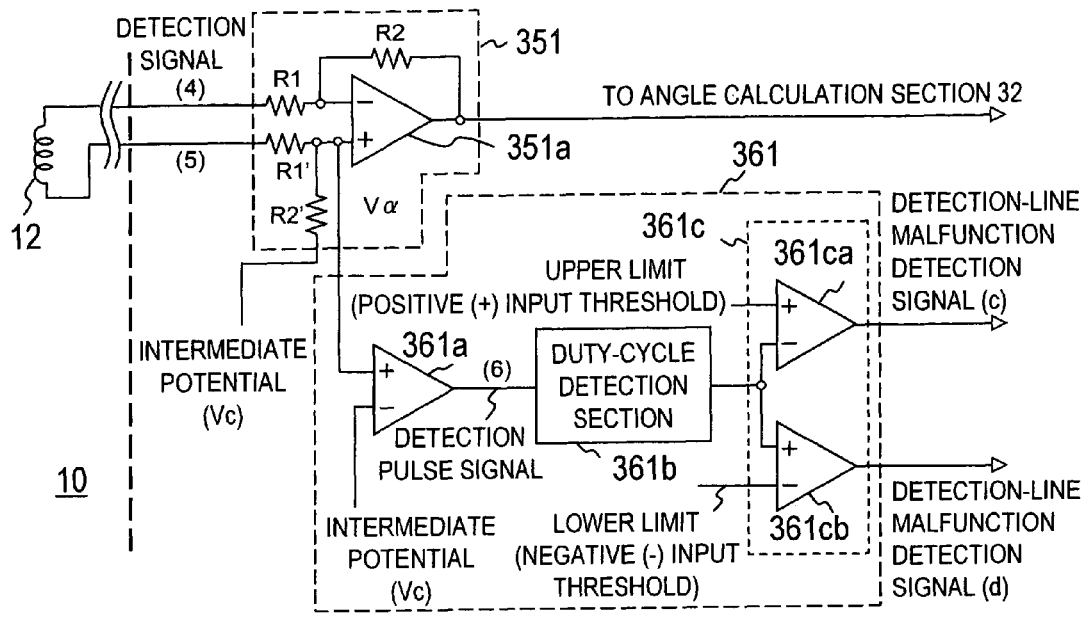
FIG. 3A is a circuit diagram showing an example configuration of a detection-signal input circuit and a detection-line short-circuit detection circuit that constitute a detection-line malfunction detection circuit.

FIG. 3A is a circuit diagram showing an example configuration of the detection-signal input circuit 351 and the detection-line short-circuit detection circuit 361, which are included in the detection-line malfunction detection circuit 35.

The detection-line input circuit 351 shown in FIG. 3A includes resistors R1, R1', R2, and R2'; and a differential amplifier 351a of which the inverting input terminal is connected to one end of the detection coil 12 through the resistor R1 and the non-inverting input terminal is connected to the other end of the detection coil 12 through the resistor R1' and which amplifies the potential difference between the inverting input terminal and the non-inverting input terminal, with a predetermined intermediate potential (Vc) being used as a reference. The resistors R1 and R1' have the same resistance, and the resistors R2 and R2' have the same resistance. The differential amplifier 351a is used in order to remove common-mode noise coming from the outside.

One end of the resistor R1 is electrically connected to one end of the detection coil 12, and one end of the resistor R1' is electrically connected to the other end of the detection coil 12. The other end of the resistor R1 is electrically connected to one end of the resistor R2 and to the negative (−) input terminal (inverting input terminal) of the differential amplifier 351a, the other end of the resistor R2 is electrically connected to the output terminal of the differential amplifier 351a, and the output terminal of the differential amplifier 351a is electrically connected to the angle calculation section 32. The other end of the resistor R1' is electrically connected to one end of the resistor R2' and to the positive (+) input terminal (non-inverting input terminal) of the differential amplifier 351a. The other end of the resistor R2' is set to have the intermediate potential (Vc).

The detection-line malfunction detection circuit 361 shown in FIG. 3A includes a comparator 361a for comparing the potential of the non-inverting input terminal of the differential amplifier 351a with a reference potential, for generating a detection pulse signal, and for outputting the generated detection pulse signal; a duty-cycle detection section 361b for receiving the detection pulse signal and for extracting and outputting a value corresponding to the duty cycle of the detection pulse signal; and a threshold comparison section 361c for receiving the value corresponding to the duty cycle of the detection pulse signal, for comparing this value with a value corresponding to a predetermined lower limit and a value corresponding to a predetermined upper limit to detect a short circuit to ground and a short circuit to power of the signal lines of the detection signal, and for outputting detection-line malfunction detection signals. The threshold comparison section 361c includes comparators 361ca and 361cb.

The positive (+) input terminal of the comparator 361a is electrically connected to the positive (+) input terminal (non-inverting input terminal) of the differential amplifier 351a, and the negative (−) input terminal thereof is set to have the intermediate potential (Vc), which serves as the reference potential. The input terminal of the duty-cycle detection section 361b is electrically connected to the output terminal of the comparator 361a, and the output terminal of the duty-cycle detection section 361b is electrically connected to the negative (−) input terminal of the comparator 361ca and the positive (+) input terminal of the comparator 361cb. The positive (+) input terminal of the comparator 361ca is electrically connected to a signal line that sends the value corresponding to the upper limit (positive (+) input threshold), and the negative (−) input terminal of the comparator 361cb is electrically connected to a signal line that sends the value corresponding to the lower limit (negative (−) input threshold). The output terminals of the comparators 361ca and 361cb are electrically connected to signal lines that output detection-line malfunction detection signals (c) and (d), respectively.

<Example Configuration of the Duty-cycle Detection Section 361b>

Figure 3B:
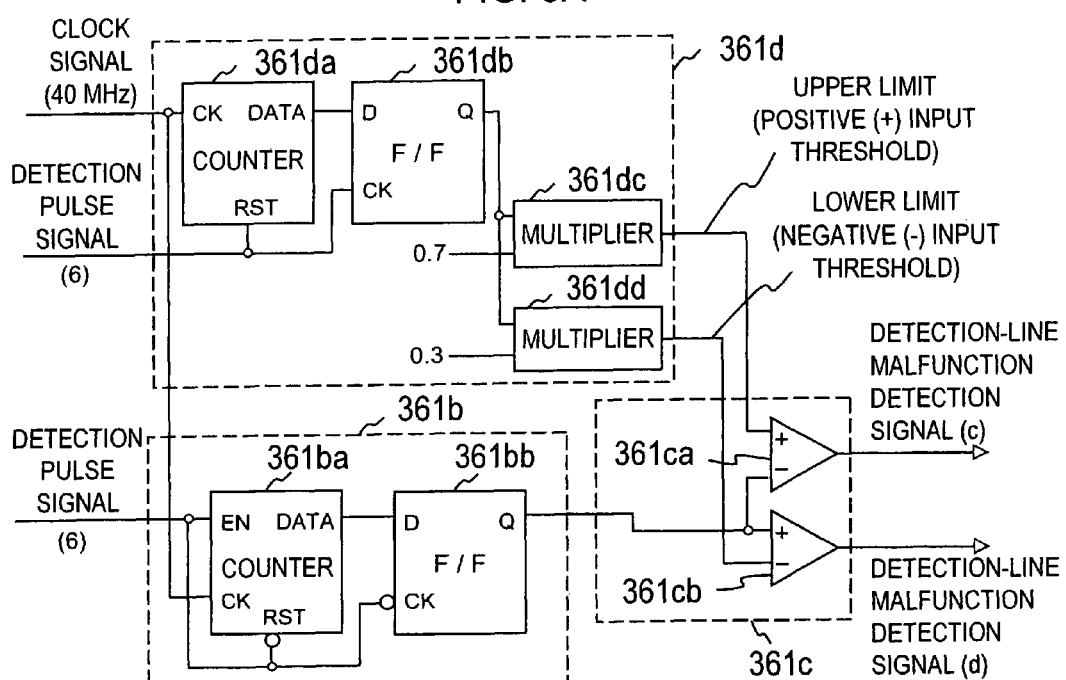
FIG. 3B is a circuit diagram showing an example duty-cycle detection section.

As an example configuration of the duty-cycle detection section 361b, it is possible to use a circuit in which a clock signal is input to a counter, the clock signal is counted only when the detection pulse signal is in a high state, and the count is output. In that case, the value corresponding to the duty cycle of the detection pulse signal is a digital value indicating the number of clock pulses included while the detection pulse signal is in a high state. FIG. 3B shows such an example digital circuit of the duty-cycle detection section 361b.

The duty-cycle detection section 361b shown in FIG. 3B is configured in the same way as the duty-cycle detection section 342 shown in FIG. 2B and includes a counter 361ba and a flip-flop (FF) 361bb. The output from the Q terminal of the duty-cycle detection section 361b corresponds to the number of clock pulses included in a high-state period in one cycle of the detection pulse signal. In other words, the output P from the Q terminal can be expressed by the following expression:

$$P=(Fc/F)\times(Dy/100)$$

where Fc indicates the frequency of the clock signal in Hertz, F indicates the frequency of the detection pulse signal in Hertz, and Dy indicates the duty cycle in percent.

Values corresponding to the upper limit (positive (+) input threshold) and the lower limit (negative (−) input threshold) for the duty-cycle detection section 361b shown in FIG. 3B are obtained by multiplying the upper limit (positive (+) input threshold) and the lower limit (negative (−) input threshold) by the number of clock pulses in one cycle of the detection pulse signal. Such threshold values can be generated, for example, by a threshold generation section 361d shown in FIG. 3B.

The threshold generation section 361d is configured in the same way as the threshold generation section 344 shown in FIG. 2B, and includes a counter 361da, a flip-flop (FF) 361db, and multipliers 361dc and 361dd. The output from the Q terminal of the FF 361db corresponds to the number of clock pulses (the number of pulses corresponding to a duty cycle of 100%, which is Fc/F) included in one cycle of the detection pulse signal. The multiplier 361dc multiplies the output from the Q terminal of the FF 361db by 0.7 and outputs the result as an upper limit (positive (+) input threshold). The multiplier 361dd multiplies the output from the Q terminal of the FF 361db by 0.3 and outputs the result as a lower limit (negative (−) input threshold). The threshold generation section 344 shown in FIG. 2B may also be used as the threshold generation section 361d shown in FIG. 3B.

The detection-signal input circuit 352 and the detection-line short-circuit detection circuit 362 have the same configurations as the detection-signal input circuit 351 and the detection-line short-circuit detection circuit 361, respectively, except that the detection-signal input circuit 352 and the detection-line short-circuit detection circuit 362 handle the cosine-phase detection signal of the detection coil 13. Therefore, a description of the detection-signal input circuit 352 and the detection-line short-circuit detection circuit 362 will be omitted here.

[Example Configuration of the Current Buffer 20]

The current buffer 20 receives the exciting signal from the exciting-signal generation circuit 31 and sends exciting signals to both ends of the exciter coil 11 by the push-pull method. A configuration shown in FIG. 6 of Japanese Patent Application Laid Open No. 2005-181186 can be used to send an exciting signal to the exciter coil of a resolver. This configuration, however, needs a capacitor (C117) at the output section so as not to apply a DC voltage with an intermediate potential to the exciter coil. The capacitor needs to have a characteristic that allows the exciting current to pass the resolver, and therefore, has a large volume and is expensive. In contrast, it is advantageous that the push-pull-type current buffer 20 of the present embodiment does not need such a capacitor. The current buffer 20 of the present embodiment is a single-power current buffer. A double-power current buffer may be used.

Figure 4A:
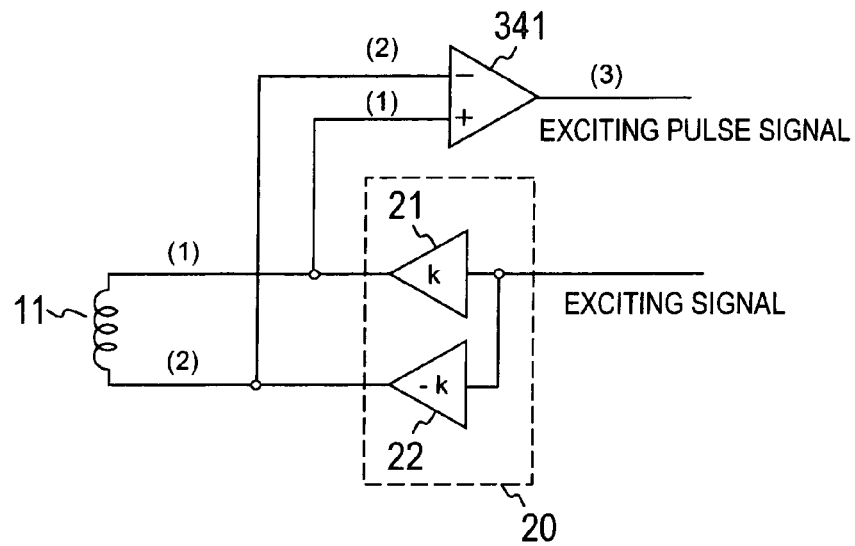
FIG. 4A is a circuit diagram showing an example configuration of a current buffer.

FIG. 4A is a circuit diagram showing an example configuration of the current buffer 20.

As shown in FIG. 4A, the current buffer 20 includes the amplifier 21 for non-inverting amplification of the input exciting signal and the amplifier 22 for inverting amplification of the input exciting signal. The input terminals of the amplifiers 21 and 22 are electrically connected to the exciting-signal generation circuit 31. The output terminal of the amplifier 21 is electrically connected to the positive (+) input terminal of the comparator 341 of the exciting-line malfunction detection circuit 34 (shown in FIG. 2A) and to one end of the exciter coil 11. The output terminal of the amplifier 22 is electrically connected to the negative (−) input terminal of the comparator 341 of the exciting-line malfunction detection circuit 34 and to the other end of the exciter coil 11.

Figure 4B:
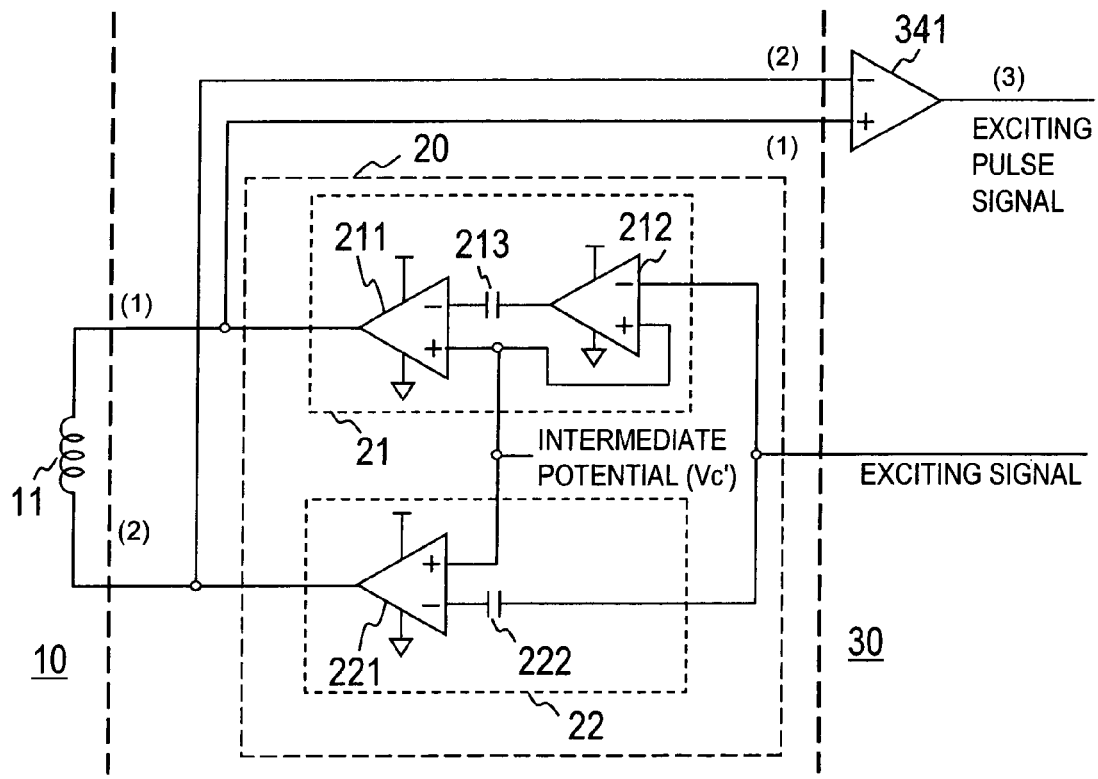
FIG. 4B is a circuit diagram showing an example specific configuration of the current buffer.

FIG. 4B is a circuit diagram showing an example specific configuration of the current buffer 20.

In FIG. 4B, the amplifier 21 is formed of amplification circuits 211 and 212 that operate with a single power source and a capacitor 213, and the amplifier 22 is formed of an amplification circuit 221 that operates with a single power source and a capacitor 222.

The exciting-signal generation circuit 31 is electrically connected to the negative (−) input terminal of the amplification circuit 212 and to one end of the capacitor 222. The other end of the capacitor 222 is electrically connected to the negative (−) input terminal of the amplification circuit 221. The positive (+) input terminal of the amplification circuit 212, the positive (+) input terminal of the amplification circuit 211, and the positive (+) input terminal of the amplification circuit 221 are electrically connected to each other, and the potential thereof is set to an intermediate potential (Vc'=2.5 V, for example). The output terminal of the amplification circuit 212 is electrically connected to one end of the capacitor 213, and the other end of the capacitor 213 is electrically connected to the negative (−) input terminal of the amplification circuit 211. The output terminal of the amplification circuit 211 serves as the output terminal of the amplifier 21, and the output terminal of the amplification circuit 221 serves as the output terminal of the amplifier 22.

[Detecting a Short Circuit to Ground or a Short Circuit to Power of the Signal Lines of the Exciting Signals]

A method for detecting a short circuit to ground or a short circuit to power of the signal lines through which the exciting signals are sent to the exciter coil 11 of the resolver 10 will be described next. The reason why the exciting-line malfunction detection circuit 34 can detect a short circuit to ground or a short circuit to power of the signal lines of the exciting signals will be described first.

[In Normal Operation]

Figure 5A:
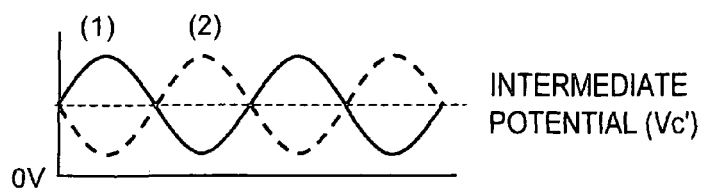
FIG. 5A is a graph showing the potentials of the positive (+) input terminal and negative (−) input terminal of a comparator, obtained when no short circuit occurs at signal lines that send exciting signals to an exciter coil.
Figure 5B:
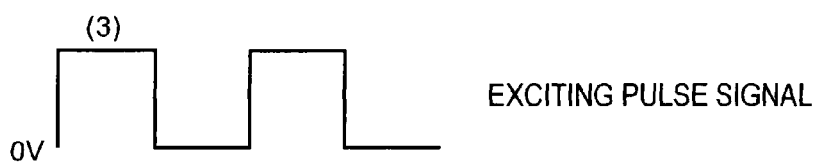
FIG. 5B is a graph showing the potential of an exciting pulse signal output from the output terminal of the comparator, obtained when no short circuit occurs at the signal lines that send the exciting signals to the exciter coil.

FIG. 5A is a graph showing the potentials of the positive (+) input terminal and negative (−) input terminal of the comparator 341, obtained when no short circuit occurs at the signal lines that send the exciting signals to the exciter coil 11. FIG. 5B is a graph showing the potential of the exciting pulse signal output from the output terminal of the comparator 341, obtained when no short circuit occurs at the signal lines that send the exciting signals to the exciter coil 11.

The amplifiers 21 and 22 have the same absolute value of their gains and have mutually opposite phases. Therefore, when no short circuit occurs at the signal lines that send the exciting signals to the exciter coil 11, the potential of an exciting signal (1) output from the amplifier 21 and input to the positive (+) input terminal of the comparator 341 and the potential of an exciting signal (2) output from the amplifier 22 and input to the negative (−) input terminal of the comparator 341 have mutually opposite phases and the same amplitude, as shown in FIG. 5A. As a result, the exciting pulse signal (3), output from the output terminal of the comparator 341, is ideally a rectangular signal having a duty cycle of 50%, as shown in Fig. 5B.

<When the Signal Line for the Exciting Signal (1) or (2) is Completely Short-circuited to Ground>

Figure 6A:
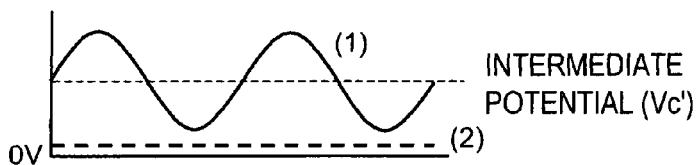
FIG. 6A is a graph showing the potentials of the positive (+) input terminal and negative (−) input terminal of the comparator, obtained when one of the signal lines for the exciting signals is completely short-circuited to the ground.
Figure 6B:
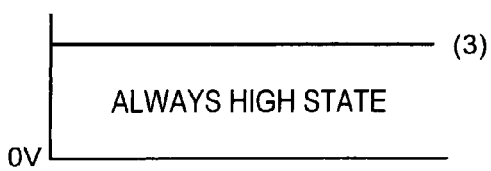
FIG. 6B is a graph showing the potential of the exciting pulse signal output from the output terminal of the comparator, obtained when the one of the signal lines for the exciting signals is completely short-circuited to the ground.

FIG. 6A is a graph showing the potentials of the positive (+) input terminal and negative (−) input terminal of the comparator 341, obtained when the signal line for the exciting signal (2) is completely short-circuited to the ground. FIG. 6B is a graph showing the potential of the exciting pulse signal output from the output terminal of the comparator 341, obtained when the signal line for the exciting signal (2) is completely short-circuited to the ground.

When the signal line for the exciting signal (2) is completely short-circuited to the ground, the potential of the exciting signal (2) output from the amplifier 22 and input to the negative (−) input terminal of the comparator 341 is equal to the ground potential, as shown in FIG. 6A. As a result, the exciting pulse signal (3), output from the output terminal of the comparator 341, is always in a high state and has a duty cycle of 100%, as shown in FIG. 6B.

Figure 6C:
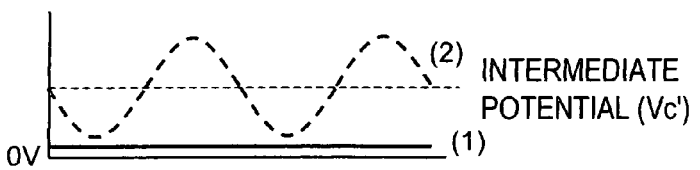
FIG. 6C is a graph showing the potentials of the positive (+) input terminal and negative (−) input terminal of the comparator, obtained when the other of the signal lines for the exciting signals is completely short-circuited to the ground.
Figure 6D:
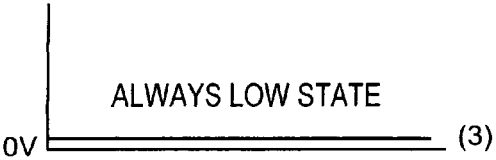
FIG. 6D is a graph showing the potential of the exciting pulse signal output from the output terminal of the comparator, obtained when the other of the signal lines for the exciting signals is completely short-circuited to the ground.

FIG. 6C is a graph showing the potentials of the positive (+) input terminal and negative (−) input terminal of the comparator 341, obtained when the signal line for the exciting signal (1) is completely short-circuited to the ground. FIG. 6D is a graph showing the potential of the exciting pulse signal output from the output terminal of the comparator 341, obtained when the signal line for the exciting signal (1) is completely short-circuited to the ground.

When the signal line for the exciting signal (1) is completely short-circuited to the ground, the potential of the exciting signal (1) output from the amplifier 21 and input to the positive (+) input terminal of the comparator 341 is equal to the ground potential, as shown in FIG. 6C. As a result, the exciting pulse signal (3), output from the output terminal of the comparator 341, is always in a low state and has a duty cycle of 0%, as shown in FIG. 6D.

<When the Signal Line for the Exciting Signal (1) or (2) is Completely Short-circuited to Power>

Figure 7A:
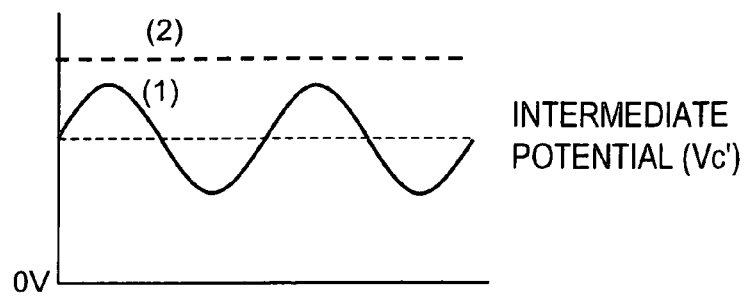
FIG. 7A is a graph showing the potentials of the positive (+) input terminal and negative (−) input terminal of the comparator, obtained when the one of the signal lines for the exciting signals is completely short-circuited to the power supply.
Figure 7B:
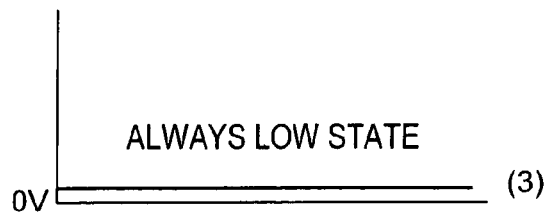
FIG. 7B is a graph showing the potential of the exciting pulse signal output from the output terminal of the comparator, obtained when the one of the signal lines for the exciting signals is completely short-circuited to the power supply.

FIG. 7A is a graph showing the potentials of the positive (+) input terminal and negative (−) input terminal of the comparator 341, obtained when the signal line for the exciting signal (2) is completely short-circuited to power. FIG. 7B is a graph showing the potential of the exciting pulse signal output from the output terminal of the comparator 341, obtained when the signal line for the exciting signal (2) is completely short-circuited to power.

When the signal line for the exciting signal (2) is completely short-circuited to power, the potential of the exciting signal (2) output from the amplifier 22 and input to the negative (−) input terminal of the comparator 341 is equal to the power supply potential, as shown in FIG. 7A. As a result, the exciting pulse signal (3), output from the output terminal of the comparator 341, is always in a low state and has a duty cycle of 0%, as shown in FIG. 7B.

Figure 7C:
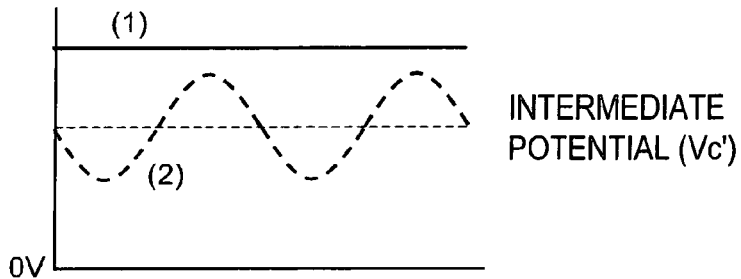
FIG. 7C is a graph showing the potentials of the positive (+) input terminal and negative (−) input terminal of the comparator, obtained when the other of the signal lines for the exciting signals is completely short-circuited to the power supply.
Figure 7D:
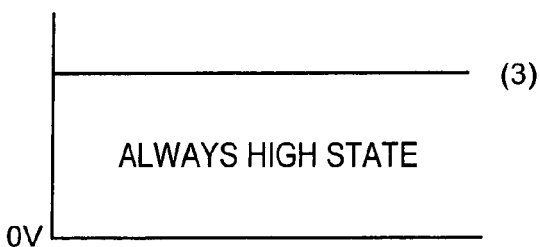
FIG. 7D is a graph showing the potential of the exciting pulse signal output from the output terminal of the comparator, obtained when the other of the signal lines for the exciting signals is completely short-circuited to the power supply.

FIG. 7C is a graph showing the potentials of the positive (+) input terminal and negative (−) input terminal of the comparator 341, obtained when the signal line for the exciting signal (1) is completely short-circuited to power. FIG. 7D is a graph showing the potential of the exciting pulse signal output from the output terminal of the comparator 341, obtained when the signal line for the exciting signal (1) is completely short-circuited to power.

When the signal line for the exciting signal (1) is completely short-circuited to power, the potential of the exciting signal (1) output from the amplifier 21 and input to the positive (+) input terminal of the comparator 341 is equal to the power supply potential, as shown in FIG. 7C. As a result, the exciting pulse signal (3), output from the output terminal of the comparator 341, is always in a high state and has a duty cycle of 100%, as shown in FIG. 7D.

<When the Signal Line for the Exciting Signal (2) is Short-circuited to Ground Via Some Resistance>

Figure 8A:
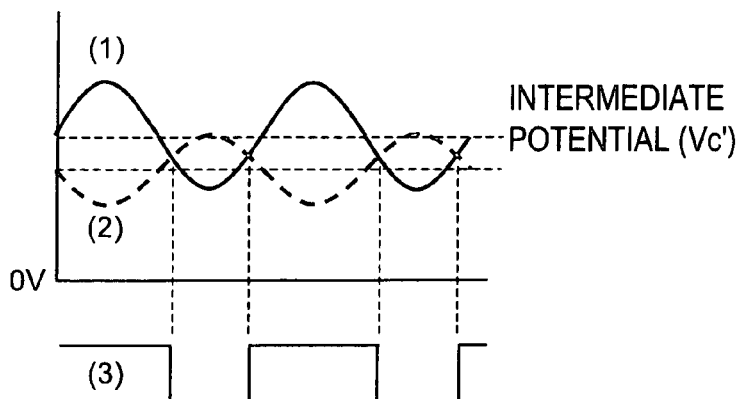
FIG. 8A is a graph showing the potentials of the positive (+) input terminal and negative (−) input terminal of the comparator, obtained when the one of the signal lines for the exciting signals is short-circuited to the ground via some resistance.
Figure 8B:
FIG. 8B is a graph showing the potential of the exciting pulse signal output from the output terminal of the comparator, obtained when the one of the signal lines for the exciting signals is short-circuited to the ground via some resistance.

FIG. 8A is a graph showing the potentials of the positive (+) input terminal and negative (−) input terminal of the comparator 341, obtained when the signal line for the exciting signal (2) is short-circuited to the ground via some resistance. FIG. 8B is a graph showing the potential of the exciting pulse signal output from the output terminal of the comparator 341, obtained when the signal line for the exciting signal (2) is short-circuited to the ground via some resistance.

When the signal line for the exciting signal (2) is short-circuited to the ground via some resistance, the waveform of the exciting signal (2) has a lower intermediate potential and a smaller amplitude than in normal operation, as shown in FIG. 8A. As a result, the exciting pulse signal (3), output from the output terminal of the comparator 341, has a duty cycle between 50% and 100%, as shown in FIG. 8B.

In the same way, when the signal line for the exciting signal (1) is short-circuited to the ground via some resistance, the exciting pulse signal (3) has a duty cycle between 0% and 50%. When the signal line for the exciting signal (2) is short-circuited to power via some resistance, the exciting pulse signal (3) has a duty cycle between 0% and 50%. When the signal line for the exciting signal (1) is short-circuited to power via some resistance, the exciting pulse signal (3) has a duty cycle between 50% and 100%.

<Relationships between the Duty Cycle of Exciting Pulse Signal and Short Circuit to Power or to Ground>

According to the foregoing description, it is found that the following relationships exist between the duty cycle of the exciting pulse signal and a short circuit to power or to ground of the signal line of the exciting signal (1) or (2).

TABLE 1

| State | Duty cycle of exciting pulse signal |
| --- | --- |
| Normal operation: | 50% |
| Short circuit to ground of signal line for exciting signal (1) | 0% (inclusive) to 50% (exclusive) |
| Short circuit to ground of signal line for exciting signal (2) | 50% (exclusive) to 100% (inclusive) |
| Short circuit to power of signal line for exciting signal (1) | 50% (exclusive) to 100% (inclusive) |
| Short circuit to power of signal line for exciting signal (2) | 0% (inclusive) to 50% (exclusive) |

This means that, by observing the duty cycle of the exciting pulse signal, a short circuit to ground or to power of the signal line for the exciting signal (1) or (2) can be detected. In the present embodiment, the upper limit (positive (+) input threshold) and the lower limit (negative (−) input threshold), which specify the normal range of the duty cycle of the exciting pulse signal, are specified, and the duty cycle of the exciting pulse signal is compared with the upper and lower limits to detect a short circuit to ground or to power of the signal line for the exciting signal (1) or (2).

The resistance via which a short circuit to ground or to power occurs depends on the structure of the apparatus, such as the layout of signal lines and the power supply. Therefore, the duty cycle of the exciting pulse signal, obtained when a short circuit to ground or to power occurs, can be assumed to some extent at the design stage. The upper limit (positive (+) input threshold) and the lower limit (negative (−) input threshold) can be specified beforehand. More specifically, for example, the lower limit (negative (−) input threshold) is set to a value (30%, for example) which is smaller than 50% and which is equal to and larger than an expected duty cycle of the exciting pulse signal when the signal line for the exciting signal (1) is short-circuited to the ground or when the signal line for the exciting signal (2) is short-circuited to power; and the upper limit (positive (+) input threshold) is set to a value (70%, for example) which is larger than 50% and which is smaller than an expected duty cycle of the exciting pulse signal when the signal line for the exciting signal (1) is short-circuited to power or when the signal line for the exciting signal (2) is short-circuited to ground.

<Processing for Detecting a Short Circuit to Ground or to Power of the Signal Line for the Exciting Signal (1) or (2), in the Exciting-line Malfunction Detection Circuit 34>

Processing for detecting a short circuit to ground or to power of the signal line for the exciting signal (1) or (2), executed by the exciting-line malfunction detection circuit 34 will be described next by referring to FIGS. 1 and 2.

The exciting signal generated by the exciting-signal generation circuit 31 is sent to the current buffer 20, and the amplifiers 21 and 22 of the current buffer 20 supply exciting current to both ends of the exciter coil 11 (shown in FIG. 1). The exciting signal (1) output from the output terminal of the amplifier 21 is input to the positive (+) input terminal of the comparator 341 (shown in FIG. 2) of the exciting-line malfunction detection circuit 34, and the exciting signal (2) output from the output terminal of the amplifier 22 is input to the negative (−) input terminal of the comparator 341 of the exciting-line malfunction detection circuit 34.

The comparator 341 compares the potentials of the exciting signal (1) and the exciting signal (2) received, and outputs the rectangular-wave exciting pulse-signal (3), which goes to a high state when the potential of the exciting signal (1) is larger than the potential of the exciting signal (2) and which goes to a low state when the potential of the exciting signal (1) is smaller than the potential of the exciting signal (2).

The exciting pulse signal (3) is input to the duty-cycle detection section 342. The duty-cycle detection section 342 generates and outputs a value corresponding to the duty cycle of the exciting pulse signal (3), as described before (with reference to FIG. 2).

The value corresponding to the duty cycle of the exciting pulse signal (3), output from the duty-cycle detection section 342, is input to the negative (−) input terminal of the comparator 343a and to the positive (+) input terminal of the comparator 343b. The value corresponding to the upper limit (positive (+) input threshold) is input to the positive (+) input terminal of the comparator 343a, and the value corresponding to the lower limit (negative (−) input threshold) is input to the negative (−) input terminal of the comparator 343b.

In this case, the exciting-line malfunction detection signals (a) and (b) output from the comparators 343a and 343b, respectively, have the following states (H indicates a high state and L indicates a low state).

TABLE 2

| State | Exciting-line malfunction detection signal (a) | Exciting-line malfunction detection signal (b) |
| --- | --- | --- |
| Normal operation | H | H |
| Short circuit to ground of signal line for exciting signal (1) | H | L |
| Short circuit to ground of signal line for exciting signal (2) | L | H |

TABLE 2-continued

| State | Exciting-line malfunction detection signal (a) | Exciting-line malfunction detection signal (b) |
|---|---|---|
| Short circuit to power of signal line for exciting signal (1) | L | H |
| Short circuit to power of signal line for exciting signal (2) | H | L |

As can be understood from this table, a short circuit of the signal lines for the exciting signals (1) and (2) can be identified by checking the states of the exciting-line malfunction detection signals (a) and (b) output from the comparator 343a and 343b, respectively.

The exciting-line malfunction detection signals (a) and (b) output from the exciting-line malfunction detection circuit 34 are sent to the angle calculation section 32 and used in processing for calculating the rotation angle of the rotor of the resolver 10 (for example, when an exciting-line malfunction detection signal that indicates a short circuit is input, the processing for calculating the rotation angle is stopped). In addition, the exciting-line malfunction detection signals (a) and (b) output from the exciting-line malfunction detection circuit 34 are output from the RD converter 30 as malfunction detection signals.

[Detecting Short Circuit to Ground or to Power of the Signal Lines for the Detection Signals]

A method for detecting a short circuit to ground or power of the signal lines for the detection signals output from the detection coils 12 and 13 of the resolver will be described next. The reason why the detection-line malfunction detection circuit 35 can detect a short circuit to ground or to power of the signal lines for the detection signals will be described first.

The sine-phase detection signal and the cosine-phase detection signal output from the detection coils 12 and 13, respectively, of the resolver 10 are defined in the following way.

Sine-phase detection signal=$A \sin \theta \sin \omega t$   [1]

Cosine-phase detection signal=$A \cos \theta \cos \omega t$   [2]

In the above expressions, $\theta$ indicates the rotation angle of the rotor with respect to the stator in the resolver 10, $\omega$ indicates the angular frequency of the exciting signals sent to the exciter coil 11, and t indicates time.

In the present embodiment, a short circuit is detected by using the detection signals before detection, which include the phase component of the exciting signals, as shown in Expressions [1] and [2]. Since a method for detecting a short circuit of the signal lines for the sine-phase detection signal by using the sine-phase detection signal and a method for detecting a short circuit of the signal lines for the cosine-phase detection signal by using the cosine-phase detection signal are similar, only the method for detecting a short circuit of the signal lines for the sine-phase detection signal by using the sine-phase detection signal will be described below.

<In Normal Operation>

As shown in FIG. 3A, signal lines (4) and (5) for the sine-phase detection signal output from the detection coil 12 are connected to the negative (−) input terminal and positive (+) input terminal of the differential amplifier 351a through the resistors R1 and R1', respectively. When the signal lines (4) and (5) of the sine-phase detection signal output from the detection coil 12 have no short circuit, the potential $V\alpha$ at the positive (+) input terminal of the differential amplifier 351a is given by:

$$V\alpha = A' \sin \omega t + Vc \quad [3]$$

where $A' = (-R2/2 \circ R1) A \sin \theta$.

As shown in FIG. 3A, the positive (+) input terminal of the comparator 361a is electrically connected to the positive (+) input terminal of the comparator 351a, and therefore, its potential is $V\alpha$; and the potential of the negative (−) input terminal of the comparator 361a is the intermediate potential Vc. Therefore, the detection pulse signal output from the output terminal of the comparator 361a is a rectangular wave having a duty cycle of 50% in normal operation.

<When the Signal Line (5) of the Sine-phase Detection Signal is Short-circuited to Ground>

Figure 9:
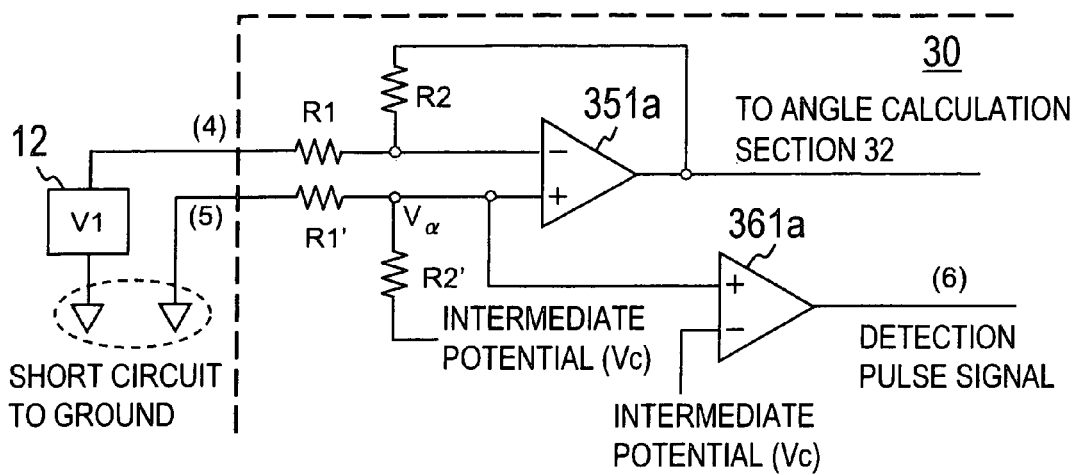
FIG. 9 shows a state in which one of signal lines for a detection coil is short-circuited to the ground.

FIG. 9 shows a state in which the signal line (5) of the detection coil 12 is short-circuited to ground.

When the signal line (5) of the detection coil 12 is short-circuited to ground, if R1 and R1' have the same resistance R, and R2 and R2' have the same resistance SR (S>0), then the following expression is satisfied:

$$V\alpha = \{R1'/(R1'+R2')\}Vc = \{R/(R+SR)\}Vc = Vc/(1+S)$$

Then, the following expression is also satisfied:

$$V\alpha - Vc = \{-S/(1+S)\}Vc \quad [4]$$

Since S is larger than zero and Vc is also larger than zero, the right-hand side of Expression [4] is smaller than zero. Therefore, the detection pulse signal (6) output from the output terminal of the comparator 361a in FIG. 9 is always in a low state and has a duty cycle of 0%.

<When the Signal Line (4) of the Sine-phase Detection Signal is Short-circuited to Ground>

Figure 10A:
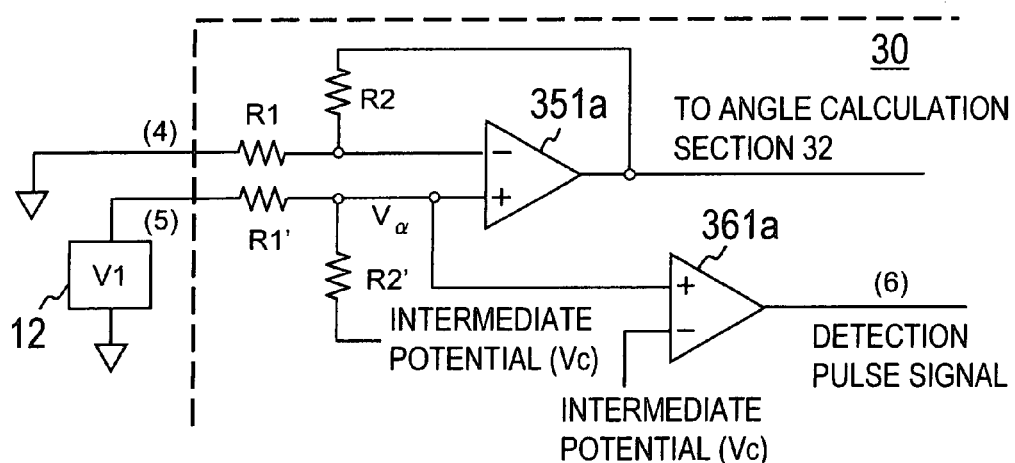
FIG. 10A is a state in which the other of the signal lines for the detection coil is short-circuited to the ground.

FIG. 10A shows a state in which the signal line (4) of the detection coil 12 is short-circuited to ground.

When the signal line (4) of the detection coil 12 is short-circuited to ground, if R1 and R1' have the same resistance R, R2 and R2' have the same resistance SR (S>0), and the potential of the detection coil 12 is V1, then the following expression is satisfied:

$$V\alpha = \{R2'/(R1'+R2')\}(V1-Vc)+Vc$$
$$= \{SR/(R+SR)\}(V1-Vc)+Vc$$
$$= \{S/(1+S)\}(V1-Vc)+Vc$$

Then, the following expression is also satisfied:

$$V\alpha - Vc = \{S/(1+S)\}(V1-Vc) \quad [5]$$

When V1 is smaller than Vc, since S is larger than zero, the right-hand side of Expression [5] is negative, indicating that $V\alpha$ is smaller than Vc. In this case, the detection pulse signal (6) output from the output terminal of the comparator 361a is always in a low state and has a duty cycle of 0%.

In contrast, when V1 is larger than Vc, the detection pulse signal (6) shows the following state.

In Expression [5], when V1 is set to B sin ωt (B indicates the amplitude of V1), ωt is obtained in the following way when Vα equals Vc:

$$0 = \{S/(1+S)\}(B \sin \omega t - Vc)$$

$$S > 0, \therefore B \sin \omega t = Vc$$

$$\sin \omega t = Vc/B$$

$$\omega t = \sin^{-1} Vc/B \quad [6]$$

Therefore, the potential of the positive (+) input terminal of the comparator 361a has a waveform where the intermediate potential Vc is crossed at ωt=sin⁻¹Vc/B. The duty cycle of the detection pulse signal is obtained by $$Dy = (1/2) - (1/\pi)\sin^{-1} Vc/B \quad [7]$$

When the amplitude B of V1 is 3 V and the intermediate potential Vc is 2.5 V, for example, ωt is obtained, from Expression [6], as follows:

$$\omega t = \sin^{-1}(2.5/3) = 0.313\pi[\text{rad}]$$

Figure 10B:
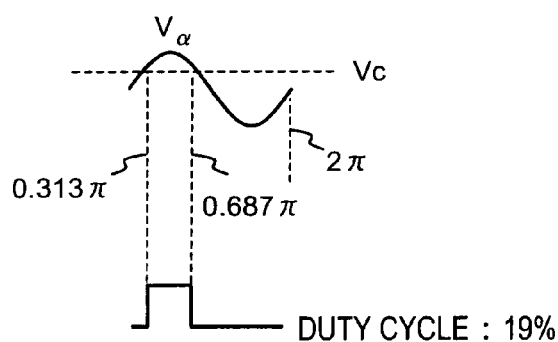
FIG. 10B is a graph showing an example potential of the positive (+) input terminal of a comparator.

In this case, the potential of the positive (+) input terminal of the comparator 361a has a waveform where the potential crosses the intermediate potential Vc in its rising part at ωt=0.313π, as shown in FIG. 10B. The duty cycle of the detection pulse signal output from the output terminal of the comparator 361a is calculated by the following expression and is found to be about 19%:

$$Dy = 0.5 - 0.313 \approx 0.19$$

<When the Signal Line (5) of the Sine-phase Detection Signal is Short-circuited to Power>

Figure 11:
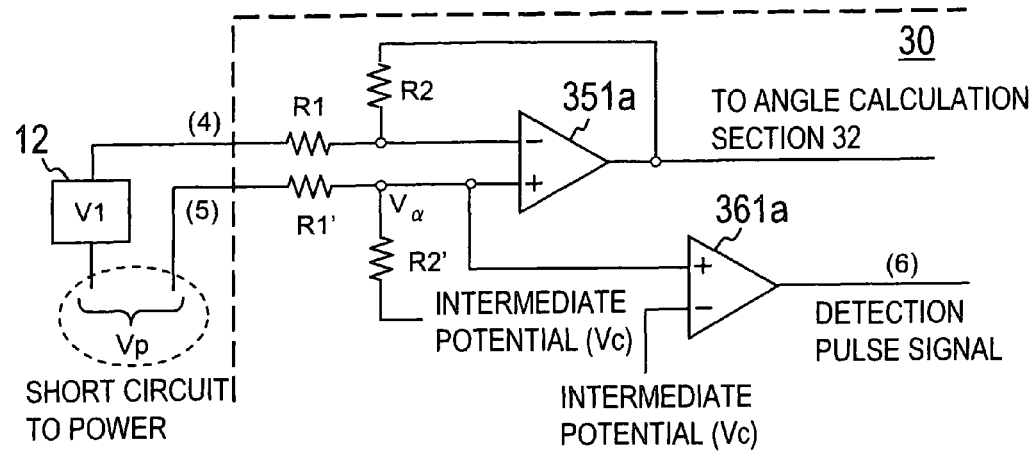
FIG. 11 is a state in which the one of the signal lines for the detection coil is short-circuited to the power supply.

FIG. 11 shows a state in which the signal line (5) of the detection coil 12 is short-circuited to power.

When the signal line (5) of the detection coil 12 is short-circuited to power, if R1 and R1' have the same resistance R, R2 and R2' have the same resistance SR (S>0), and the potential of the power supply is Vp, then the following expression is satisfied:

$$V\alpha = \{R2'/(R1' + R2')\}(Vp - Vc) + Vc$$
$$= \{SR/(R + SR)\}(Vp - Vc) + Vc$$
$$= \{S/(1 + S)\}(Vp - Vc) + Vc$$

Then, the following expression is also satisfied:

$$V\alpha - Vc = \{S/(1+S)\}(Vp - Vc) \quad [8]$$

Since Vp is the potential of the power supply, Vp is always larger than Vc. When Vp is larger than Vc, it is found from Expression [8] that Vα is always larger than Vc. In this case, the detection pulse signal output from the output terminal of the comparator 361a is always in a high state and has a duty cycle of 100%.

<When the Signal Line (4) of the Sine-phase Detection Signal is Short-circuited to Power>

Figure 12A:
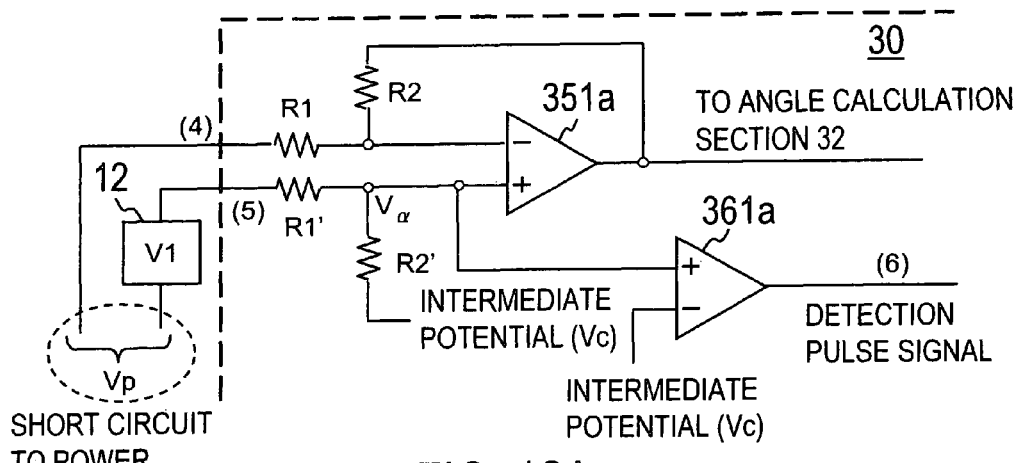
FIG. 12A is a state in which the other of the signal lines for the detection coil is short-circuited to the power supply.

FIG. 12A shows a state in which the signal line (4) of the detection coil 12 is short-circuited to power.

When the signal line (4) of the detection coil 12 is short-circuited to power, if R1 and R1' have the same resistance R, R2 and R2' have the same resistance SR (S>0), the potential of the detection coil 12 is V1, and the potential of the power supply is Vp, then the following expression is satisfied:

$$V\alpha = \{R2'/(R1' + R2')\}(V1 + Vp - Vc) + Vc$$
$$= \{SR/(R + SR)\}(V1 + Vp - Vc) + Vc$$
$$= \{S/(1 + S)\}(V1 + Vp - Vc) + Vc$$

Then, the following expression is also satisfied:

$$V\alpha - Vc = \{S/(1+S)\}\{(V1+Vp) - Vc\} \quad [9]$$

When (V1+Vp) is larger than Vc, since S is larger than zero, the right-hand side of Expression [9] is positive, indicating that Vα is larger than Vc. In this case, the detection pulse signal (6) output from the output terminal of the comparator 361a in FIG. 12A is always in a high state and has a duty cycle of 100%.

In contrast, when (V1+Vp) is smaller than Vc, the detection pulse signal (6) shows the following state.

In Expression [9], when V1 is set to A sin ωt (A indicates the amplitude of V1), ωt is obtained in the following way when Vα equals Vc:

$$0 = \{S/(1+S)\}\{(A \sin \omega t + Vp) - Vc\}$$

$$0 = A \sin \omega t + Vp - Vc$$

$$\sin \omega t = (Vc - Vp)/A$$

$$\omega t = \sin^{-1}(Vc - Vp)/A \quad [10]$$

Therefore, the potential of the positive (+) input terminal of the comparator 361a has a waveform where the intermediate potential Vc is crossed at ωt=sin⁻¹(Vc−Vp)/A. The duty cycle of the detection pulse signal is obtained by $$Dy = (1/2) - (1/\pi)\sin^{-1}(Vc - Vp)/A \quad [11]$$

When the potential Vp of the power supply is 5 V, the amplitude A of V1 is 3 V, and the intermediate potential Vc is 2.5 V, for example, then ωt is obtained, from Expression [10], as follows:

$$\omega t = \sin^{-1}(-2.5/3) = -0.313\pi[\text{rad}]$$

Figure 12B:
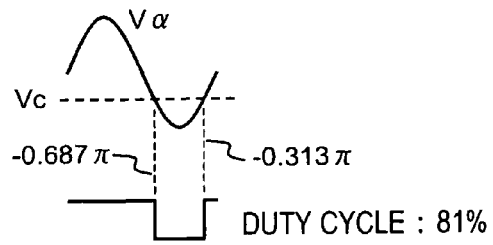
FIG. 12B is a graph showing an example potential of the positive (+) input terminal of the comparator.

In this case, the potential of the positive (+) input terminal of the comparator 361a has a waveform where the potential crosses the intermediate potential Vc in its rising part at ωt=−0.313π, as shown in FIG. 12B. The duty cycle of the detection pulse signal (6) output from the output terminal of the comparator 361a is calculated by the following expression and is found to be about 81%:

$$Dy = 0.5 + 0.313 \approx 0.81$$

<Relationships between Duty Cycle of Detection Pulse Signal and Short Circuit to Power or to Ground>

According to the foregoing description, it is found that the following relationships exist between the duty cycle of the detection pulse signal and a short circuit to power or to ground of the signal line (4) or (5) of the detection signals.

TABLE 3

| State | Duty cycle of detection pulse signal |
| --- | --- |
| Normal operation: | 50% |
| Short circuit to ground of signal line: (5) for detection signal | 0% |

TABLE 3-continued

| State | Duty cycle of detection pulse signal |
|---|---|
| Short circuit to ground of signal line (4) for detection signal | 0% when V1 < Vc<br>{(1/2) − (1/π)sin$^{-1}$Vc/B} · 100% when V1 > Vc |
| Short circuit to power of signal line (5) for detection signal | 100% |
| Short circuit to power of signal line (4) for detection signal | 100% when (V1 + Vp) < Vc<br>{(1/2) − (1/π)sin$^{-1}$(Vc − Vp)/A} · 100% when (V1 + Vp) > Vc |

This means that a short circuit to ground or to power of the signal lines for the detection signal can be detected by observing the duty cycle of the detection pulse signal. In the present embodiment, the upper limit (positive (+) input threshold) and the lower limit (negative (−) input threshold), which specify the normal range of the duty cycle of the detection pulse signal, are specified, and the duty cycle of the detection pulse signal is compared with the upper and lower limits to detect a short circuit to ground or to power of the signal lines for the detection signal.

As shown in Table 3, the duty cycle of the detection pulse signal is determined when parameters V1, Vc, Vp, A, and B are all specified. These parameters V1, Vc, Vp, A, and B depend on the structure of the apparatus, such as the layout of the signal lines and the power supply. Therefore, the duty cycle of the detection pulse signal obtained at each state can be assumed to some extent at the design stage. The upper limit (positive (+) input threshold) and the lower limit (negative (−) input threshold) can be specified beforehand.

It is preferred that these parameters V1, Vc, Vp, A, and B satisfy the following expressions:

$$1/2 > Dy(\min) > 1/2 − (1/\pi)\sin^{-1}(Vc/B) \quad [12]$$

$$1/2 < Dy(\max) < 1/2 − (1/\pi)\sin^{-1}[(Vc − Vp)/A] \quad [13]$$

where Dy(min) indicates the lower limit (negative (−) input threshold) and Dy(max) indicates the upper limit (positive (+) input threshold). When Expressions [12] and [13] are satisfied, if a short circuit to ground or to power occurs, it can be always detected because the duty cycle of the detection pulse signal does not fall in the range between the upper limit (positive (+) input threshold) and the lower limit (negative (−) input threshold).

<Processing for Detecting a Short Circuit to Ground or to Power of the Signal Lines for the Detection Signals, in the Detection-line Malfunction Detection Circuit 35>

Processing for detecting a short circuit to ground or to power of the signal lines for the detection signals, executed by the detection-line malfunction detection circuit 35 will be described next by referring to FIGS. 1 and 3. Only processing for detecting a short circuit to ground or to power of the signal lines for the sine-phase detection signal will be described below, but processing for detecting a short circuit to ground or to power of the signal lines for the cosine-phase detection signal is executed in a similar way.

The signal lines (4) and (5) of the sine-phase detection signal obtained across both ends of the detection coil 12 in the resolver 10 are connected to the negative (−) input terminal (inverting input terminal) and the positive (+) input terminal (non-inverting input terminal) of the differential amplifier 351a of the detection-line input section 351 through the resistors R1 and R1', respectively. The potential Vα at the positive (+) input terminal of the differential amplifier 351a is applied to the positive (+) input terminal of the comparator 361a, and the intermediate potential Vc is applied to the negative (−) input terminal of the comparator 361a.

The comparator 361a compares these potentials and outputs the rectangular-wave detection pulse signal (6), which goes to a high state when the potential of the positive (+) input terminal is larger than the potential of the negative (−) input terminal and which goes to a low state when the potential of the positive (+) input terminal is smaller than the potential of the negative (−) input terminal.

The detection pulse signal (6) is input to the duty-cycle detection section 361b. The duty-cycle detection section 361b generates and outputs a value corresponding to the duty cycle of the detection pulse signal (6), as described before (with reference to FIG. 3).

The value corresponding to the duty cycle of the detection pulse signal (6), output from the duty-cycle detection section 361b, is input to the negative (−) input terminal of the comparator 361ca and to the positive (+) input terminal of the comparator 361cb. The value corresponding to the upper limit (positive (+) input threshold) is input to the positive (+) input terminal of the comparator 361ca, and the value corresponding to the lower limit (negative (−) input threshold) is input to the negative (−) input terminal of the comparator 361cb, as described before (with reference to FIG. 3).

When Expressions [12] and [13] are satisfied, the detection-line malfunction detection signals (c) and (d) output from the comparators 361ca and 361cb, respectively, have the following states (H indicates a high state and L indicates a low state).

TABLE 4

| State | Detection-line malfunction detection signal (c) | Detection-line malfunction detection signal (d) |
|---|---|---|
| Normal operation | H | H |
| Short circuit to ground of signal line (5) for detection signal | H | L |
| Short circuit to ground of signal line (4) for detection signal | H | L |
| Short circuit to power of signal line (5) for detection signal | L | H |
| Short circuit to power of signal line (4) for detection signal | L | H |

As can be understood from this table, a short circuit of the signal lines for the detection signal can be identified by checking the states of the detection-line malfunction detection signals (c) and (d) output from the comparators 361ca and 361cb, respectively.

The detection-line malfunction detection signals (c) and (d) output from the detection-line malfunction detection circuit 35 are sent to the angle calculation section 32 and used in the processing for calculating the rotation angle of the rotor of the resolver 10 (for example, when a detection-line malfunction detection signal is input, the processing for calculating the rotation angle is stopped). In addition, the detection-line malfunction detection signals (c) and (d) output from the detection-line malfunction detection circuit 35 are output from the RD converter 30 as malfunction detection signals.

[Countermeasure to be Taken at Singular Points in Detection Signal]

The sine-phase detection signal and the cosine-phase detection signal output from the detection coils 12 and 13, respectively, of the resolver 10 are given by the following, as described before:

$$\text{Sine-phase detection signal} = A \sin\theta \sin\omega t \qquad [14]$$

$$\text{Cosine-phase detection signal} = A \cos\theta \cos\omega t \qquad [15]$$

When the rotation angle θ of the rotor with respect to the stator in the resolver 10 is zero or π, the sine-phase detection signal is zero. When the rotation angle θ of the rotor with respect to the stator in the resolver 10 is π/2 or 3π/2, the cosine-phase detection signal is zero. In those cases, the positive (+) input terminal and the negative (−) input terminal of the comparator that generates the detection pulse signal (comparator 361a for the sine-phase detection signal) always have the same potential, and the output of the comparator cannot be determined.

One example countermeasure for this problem is not to detect a short circuit of the signal lines for the sine-phase detection signal when the rotation angle θ is 0±δ or π±δ, and not to detect a short circuit of the signal lines for the cosine-phase detection signal when the rotation angle θ is π/2±δ or 3π/2±δ, where δ is a constant close to 0.056π [rad], for example.

Another example countermeasure would be to set the potential (reference potential) of the negative (−) input terminal of the comparator that generates the detection pulse signal (comparator 361a for the sine-phase detection signal) to a value smaller than the intermediate potential and equal to or larger than the minimum potential of the non-inverting input terminal of the differential amplifier, or to set it to a value larger than the intermediate potential and equal to or smaller than the maximum potential of the non-inverting input terminal of the differential amplifier.

It is preferred in the detection of a short circuit to ground that the following expression be satisfied:

$$1/2 > Dy(\min) > 1/2 - (1/\pi)\sin^{-1}[\{Vc/(BK)\}\{G(1+K)-1\}] \qquad [16]$$

where Vc indicates the intermediate potential, GVc indicates the reference potential, with G being set smaller than 1, K indicates the gain of the differential amplifier, B indicates, when one end of the detection coil, connected to the inverting input terminal, is short-circuited to ground, the amplitude of the potential at the other end of the detection coil, and Dy(min) indicates the lower limit. It is preferred in the detection of a short circuit to power that the following expression be satisfied:

$$1/2 < Dy(\max) < 1/2 - (1/\pi)\sin^{-1}[\{Vc/(AK)\}\{G(1+K)-1\}-(Vp/A)] \qquad [17]$$

where G is larger than 1, A indicates, when one end of the detection coil, connected to the non-inverting input terminal, is short-circuited to power, the amplitude of the potential at the other end of the detection coil, Vp indicates the potential of the power supply, and Dy(max) indicates the upper limit. When Expression [16] or [17] is satisfied, if a short circuit to ground or to power occurs, it can always be detected because the duty cycle of the detection pulse signal does not fall in the range between the upper limit (positive (+) input threshold) and the lower limit (negative (−) input threshold).

When an appropriate countermeasure is taken, the comparators that generate the detection pulse signals output definite values at the singular points of the sine-phase detection signal and the cosine-phase detection signal. Therefore, a short circuit can be detected successfully regardless of the value of the rotation angle of the rotor with respect to the stator in the revolver 10.

Figure 13:
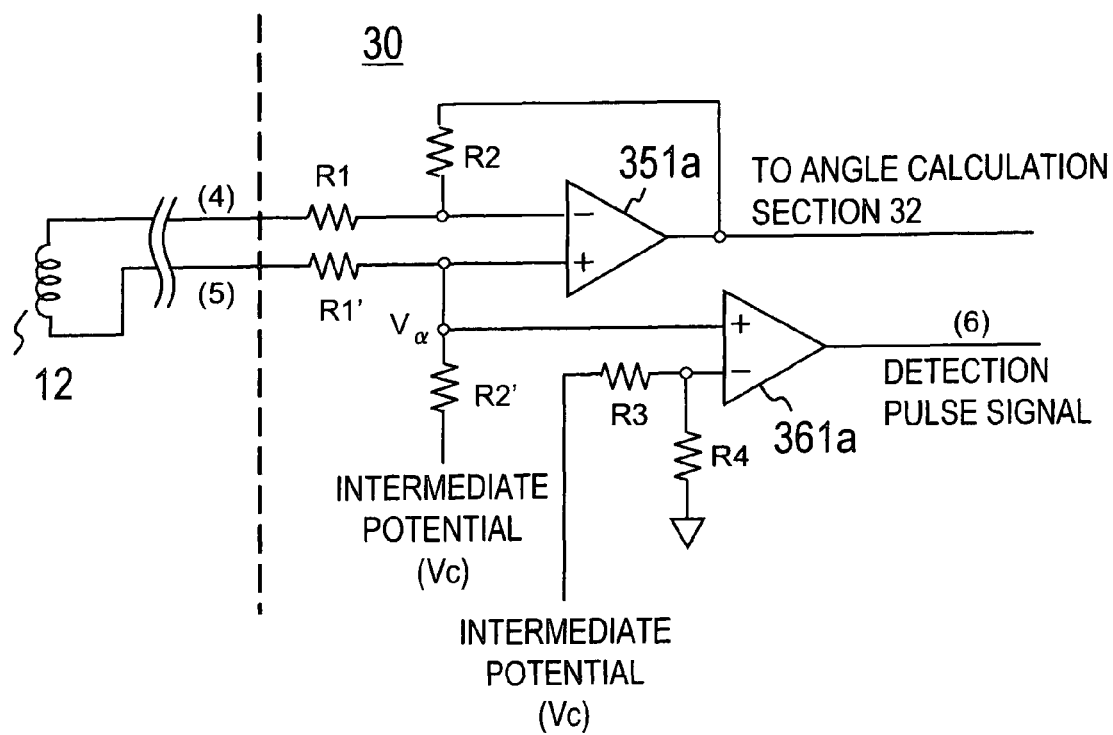
FIG. 13 shows an example configuration in which the potential (reference potential) of the negative (−) input terminal of the comparator is set smaller than an intermediate potential Vc.

FIG. 13 shows an example configuration in which the potential (reference potential) of the negative (−) input terminal of the comparator 361a is set smaller than the intermediate potential Vc. In FIG. 13, the negative (−) input terminal of the comparator 361a is electrically connected to one end of a resistor R3 and the intermediate potential (Vc) is applied to the other end of the resistor R3. The negative (−) input terminal of the comparator 361a is further connected to one end of a resistor R4, the other end of which is connected to the ground.

The present invention is not limited to the above-described embodiment. In the above-described embodiment, the short-circuit detection circuit 33 includes the exciting-line malfunction detection circuit 34 and the detection-line malfunction detection circuit 35. The short-circuit detection circuit 33 may, for example, include either one of the exciting-line malfunction detection circuit 34 and the detection-line malfunction detection circuit 35. When only the detection-line malfunction detection circuit 35 is included, the current buffer 20 does not need to employ the push-pull method.

In the above-described embodiment, the detection-line malfunction detection circuit 35 can detect a short circuit of the signal lines for the sine-phase detection signal and the signal lines for the cosine-phase detection signal. However, the detection-line malfunction detection circuit 35 may be configured so as to detect a short circuit of either the signal lines for the sine-phase detection signal or the signal lines for the cosine-phase detection signal.

In the above-described embodiment, a short circuit to ground and a short circuit to power are detected. However, the configuration may be made such that either a short circuit to ground or a short circuit to power is detected.

Appropriate modifications can also be made within the scope of the present invention.

At least a part of the short-circuit detection circuit 33 may be implemented by a computer. In that case, the processing of the function each component needs to have is specified by a program. When the computer executes the program, the processing of the function is implemented by the computer.

The program specifying the processing of the functions can be recorded in a computer-readable recording medium. Such media include, for example, magnetic recording devices, optical disks, magneto-optical recording media, semiconductor memories, and other recording devices. Specifically, for example, the magnetic recording devices include hard disk units, flexible disks, and magnetic tape; the optical disks include digital versatile discs (DVDs), DVD-random access memories (DVD-RAMs), compact disc read only memories (CD-ROMs), CD-recordables (CD-Rs), and CD-rewritables (CD-RWs); the magneto-optical recording media include magneto-optical discs (MOs); and the semiconductor memories include electronically erasable and programmable read only memories (EEPROMs).

The program is distributed, for example, by selling, transferring, or lending a portable recording medium that has the program recorded thereon, such as a DVD or a CD-ROM. The program may be distributed such that the program is stored in a server computer and is transmitted from the server computer to another computer through a network.

The computer which executes the program, for example, temporarily stores the program recorded in a portable recording medium or the program transmitted from a server computer in its storage unit, reads the program stored in its storage unit when executing the processing, and executes the processing according to the read program.

The industrial fields where the present invention can be used include, for example, the detection of a short circuit of a signal line that connects a resolver that detects the rotation angle of a rotating member which stops or rotates in an irregular way, to an RD converter.

What is claimed is:

1. A short-circuit detection circuit for detecting a short circuit of a signal line connected to a resolver in which an exciting signal is sent to an exciter coil and two detection signals of sine-phase and cosine-phase electromagnetically induced in two detection coils are output, the short-circuit detection circuit comprising:

an exciting-line malfunction detection circuit for comparing potentials at both ends of the exciter coil to which the exciting signal is sent by a push-pull method; for detecting at least one of a short circuit to ground and a short circuit to a power supply of a signal line for the exciting signal based on a duty cycle of an exciting pulse signal that is a rectangular-wave indicating a result of the comparison of the potentials at both ends of the exciter coil; and for outputting an exciting-line malfunction detection signal indicating a result of the detection of the short circuit, wherein the exciting-line malfunction detection circuit comprises:

a comparator for comparing the potentials at both ends of the exciter coil to generate the exciting pulse signal and for outputting the generated exciting pulse signal;

a duty-cycle detection section for receiving the exciting pulse signal and for extracting and outputting a value corresponding to the duty cycle of the exciting pulse signal; and a threshold comparison section for receiving the value corresponding to the duty cycle of the exciting pulse signal, for comparing the value corresponding to the duty cycle of the exciting pulse signal with at least one of a value corresponding to a predetermined lower limit and a value corresponding to a predetermined upper limit to detect at least one of a short circuit to the ground and a short circuit to the power supply of the signal line for the exciting signal, and for outputting the exciting-line malfunction detection signal.

2. A resolver-digital converter comprising:
a short-circuit detection circuit according to claim 1;
an exciting-signal generation circuit for generating the exciting signal to be sent to the resolver; and
an angle calculation section for converting the detection signals output from the revolver to a digital angle signal.

3. A short-circuit detection circuit for detecting a short circuit of a signal line connected to a resolver in which an exciting signal is sent to an exciter coil and two detection signals of sine-phase and cosine-phase electromagnetically induced in two detection coils are output, the short-circuit detection circuit comprising:

an exciting-line malfunction detection circuit for comparing potentials at both ends of the exciter coil to which the exciting signal is sent by a push-pull method; for detecting at least one of a short circuit to ground and a short circuit to a power supply of a signal line for the exciting signal based on a duty cycle of an exciting pulse signal that is a rectangular-wave indicating a result of the comparison of the potentials at both ends of the exciter coil; and for outputting an exciting-line malfunction detection signal indicating a result of the detection of the short circuit; and a detection-line malfunction detection circuit for comparing a predetermined reference potential with a potential of at least one of the detection signals, the detection signals being detected without applying an operation to extract the envelope of a waveform; for detecting at least one of a short circuit to the ground and a short circuit to the power supply of a signal line for the at least one of the detection signals based on the duty cycle of a detection pulse signal that is a rectangular-wave indicating a result of the comparison of the predetermined reference potential with the potential of at least one of the detection signals; and for outputting a detection-line malfunction detection signal indicating a result of the detection of the short circuit, wherein the detection-line malfunction detection circuit comprises:

a differential amplifier of which an inverting input terminal is connected to one end of either of the two detection coils and a non-inverting input terminal is connected to the other end of the detection coil and which amplifies a potential difference between the inverting input terminal and the non-inverting input terminal, with a predetermined intermediate potential being used as a reference, and outputs the amplified potential difference;

a comparator for comparing a potential at the non-inverting input terminal of the differential amplifier with the reference potential to generate the detection pulse signal and for outputting the generated detection pulse signal;

a duty-cycle detection section for receiving the detection pulse signal and for extracting and outputting a value corresponding to the duty cycle of the detection pulse signal; and a threshold comparison section for receiving the value corresponding to the duty cycle of the detection pulse signal, for comparing the value corresponding to the duty cycle of the detection pulse signal with at least one of a value corresponding to a predetermined lower limit and a value corresponding to a predetermined upper limit to detect at least one of the short circuit to the ground and the short circuit to the power supply of the signal line for the at least one of the detection signals, and for outputting the detection-line malfunction detection signal.

4. The short-circuit detection circuit according to claim 3, wherein the reference potential is equal to or larger than a minimum potential at the non-inverting input terminal of the differential amplifier and smaller than the intermediate potential, or is larger than the intermediate potential and equal to or smaller than a maximum potential at the non-inverting input terminal of the differential amplifier.

5. The short-circuit detection circuit according to claim 3, wherein following expressions are satisfied:

$$1/2 > Dy(\min) > 1/2 - (1/\pi)\sin^{-1}[\{Vc/(BK)\}\{G(1+K)-1\}]$$

where Vc indicates the intermediate potential, G indicates a constant, GVc indicates the reference potential, K indicates a gain of the differential amplifier, B indicates, when the one end of the detection coil, connected to the inverting input terminal, is short-circuited to the ground, the amplitude of the potential at the other end of the detection coil, and Dy(min) indicates the lower limit; and $$1/2 < Dy(\max) < 1/2 - (1/\pi)\sin^{-1}[\{Vc/(AK)\}\{G(1+K)-1\} - (Vp/A)]$$

where A indicates, when the other end of the detection coil, connected to the non-inverting input terminal, is short-circuited to the power supply, the amplitude of the potential at the one end of the detection coil, Vp indicates a potential of the power supply, and Dy(max) indicates the upper limit.

6. The short-circuit detection circuit according to claim 5, wherein the reference potential is equal to or larger than a minimum potential at the non-inverting input terminal of the differential amplifier and smaller than the intermediate potential, or is larger than the intermediate potential and equal to or smaller than a maximum potential at the non-inverting input terminal of the differential amplifier.

7. A short-circuit detection circuit for detecting a short circuit of a signal line connected to a resolver in which an exciting signal is sent to an exciter coil and two detection signals of sine-phase and cosine-phase electromagnetically induced in two detection coils are output, the short-circuit detection circuit comprising:
   a detection-line malfunction detection circuit for comparing a predetermined reference potential with a potential of at least one of the detection signals, the detection signals being detected without applying an operation to extract the envelope of a waveform; for detecting at least one of a short circuit to ground and a short circuit to a power supply of a signal line for the at least one of the detection signals based on the duty cycle of a detection pulse signal that is a rectangular-wave indicating a result of the comparison of the predetermined reference potential with the potential of at least one of the detection signals; and for outputting a detection-line malfunction detection signal indicating a result of the detection of the short circuit, wherein the detection-line malfunction detection circuit comprises:
      a differential amplifier of which an inverting input terminal is connected to one end of either of the two detection coils and a non-inverting input terminal is connected to the other end of the detection coil and which amplifies a potential difference between the inverting input terminal and the non-inverting input terminal, with a predetermined intermediate potential being used as a reference, and outputs the amplified potential difference;
      a comparator for comparing a potential at the non-inverting input terminal of the differential amplifier with the reference potential to generate the detection pulse signal and for outputting the generated detection pulse signal;
      a duty-cycle detection section for receiving the detection pulse signal and for extracting and outputting a value corresponding to the duty cycle of the detection pulse signal; and
      a threshold comparison section for receiving the value corresponding to the duty cycle of the detection pulse signal, for comparing the value corresponding to the duty cycle of the detection pulse signal with at least one of a value corresponding to a predetermined lower limit and a value corresponding to a predetermined upper limit to detect at least one of the short circuit to the ground and the short circuit to the power supply of the signal line for the at least one of the detection signals, and for outputting the detection-line malfunction detection signal.

8. The short-circuit detection circuit according to claim 7, wherein the reference potential is equal to or larger than a minimum potential at the non-inverting input terminal of the differential amplifier and smaller than the intermediate potential, or is larger than the intermediate potential and equal to or smaller than a maximum potential at the non-inverting input terminal of the differential amplifier.

9. The short-circuit detection circuit according to claim 7, wherein following expressions are satisfied:

$$1/2 > Dy(min) > 1/2 - (1/\lambda)\sin^{-1}[\{Vc/(BK)\}\{G(1+K)-1\}]$$

where Vc indicates the intermediate potential, G indicates a constant, GVc indicates the reference potential, K indicates a gain of the differential amplifier, B indicates, when the one end of the detection coil, connected to the inverting input terminal, is short-circuited to the ground, the amplitude of the potential at the other end of the detection coil, and Dy(min) indicates the lower limit; and $$1/2 < Dy(max) < 1/2 - (1/\pi)\sin^{-1}[\{Vc/(AK)\}\{G(1+K)-1\} - (Vp/A)]$$

where A indicates, when the other end of the detection coil, connected to the non-inverting input terminal, is short-circuited to the power supply, the amplitude of the potential at the one end of the detection coil, Vp indicates a potential of the power supply, and Dy(max) indicates the upper limit.

10. The short-circuit detection circuit according to claim 9, wherein the reference potential is equal to or larger than a minimum potential at the non-inverting input terminal of the differential amplifier and smaller than the intermediate potential, or is larger than the intermediate potential and equal to or smaller than a maximum potential at the non-inverting input terminal of the differential amplifier.

11. A resolver-digital converter comprising:
   a short-circuit detection circuit according to claim 7;
   an exciting-signal generation circuit for generating the exciting signal to be sent to the resolver; and
   an angle calculation section for converting the detection signals output from the revolver to a digital angle signal.

12. A digital angle detection apparatus comprising:
   a resolver in which an exciting signal is sent to an exciter coil and two detection signals of sine-phase and cosine-phase electromagnetically induced in two detection coils are output;
   an exciting-signal generation circuit for generating the exciting signal;
   a current buffer for amplifying the exciting signal and for sending the amplified exciting signal to the resolver by a push-pull method;
   an angle calculation section for converting the detection signals output from the resolver to a digital angle signal; and
   an exciting-line malfunction detection circuit for comparing potentials at both ends of the exciter coil to which the exciting signal is sent by the push-pull method, for detecting at least one of a short circuit to ground and a short circuit to a power supply of a signal line for the exciting signal based on a duty cycle of an exciting pulse signal that is a rectangular-wave indicating a result of the comparison of the potentials at both ends of the exciter coil, and for outputting an exciting-line malfunction detection signal indicating a result of the detection of the short circuit, wherein the exciting-line malfunction detection circuit comprises:
      a comparator for comparing the potentials at both ends of the exciter coil to generate the exciting pulse signal and for outputting the generated exciting pulse signal;
      a duty-cycle detection section for receiving the exciting pulse signal and for extracting and outputting a value corresponding to the duty cycle of the exciting pulse signal; and
      a threshold comparison section for receiving the value corresponding to the duty cycle of the exciting pulse signal, for comparing the value corresponding to the duty cycle of the exciting pulse signal with at least one of a value corresponding to a predetermined lower limit and a value corresponding to a predetermined upper limit to detect at least one of a short circuit to the ground and a short circuit to the power supply of the signal line for the exciting signal, and for outputting the exciting-line malfunction detection signal.

13. A digital angle detection apparatus comprising:

a resolver in which an exciting signal is sent to an exciter coil and two detection signals of sine-phase and cosine-phase electromagnetically induced in two detection coils are output;

an exciting-signal generation circuit for generating the exciting signal;

a current buffer for amplifying the exciting signal and for sending the amplified exciting signal to the resolver;

an angle calculation section for converting the detection signals output from the resolver to a digital angle signal; and a detection-line malfunction detection circuit for comparing a predetermined reference potential with a potential of at least one of the detection signals, the detection signals being detected without applying an operation to extract the envelope of a waveform; for detecting at least one of a short circuit to ground and a short circuit to a power supply of a signal line for the at least one of the detection signals based on the duty cycle of a detection pulse signal that is a rectangular-wave indicating a result of the comparison of the predetermined reference potential with the potential of at least one of the detection signals; and for outputting a detection-line malfunction detection signal indicating a result of the detection of the short circuit, wherein the detection-line malfunction detection circuit comprises:

a differential amplifier of which an inverting input terminal is connected to one end of either of the two detection coils and a non-inverting input terminal is connected to the other end of the detection coil and which amplifies a potential difference between the inverting input terminal and the non-inverting input terminal, with a predetermined intermediate potential being used as a reference, and outputs the amplified potential difference;

a comparator for comparing a potential at the non-inverting input terminal of the differential amplifier with the reference potential to generate the detection pulse signal and for outputting, the generated detection pulse signal;

a duty-cycle detection section for receiving the detection pulse signal and for extracting and outputting a value corresponding to the duty cycle of the detection pulse signal; and a threshold comparison section for receiving the value corresponding to the duty cycle of the detection pulse signal, for comparing the value corresponding to the duty cycle of the detection pulse signal with at least one of a value corresponding to a predetermined lower limit and a value corresponding to a predetermined upper limit to detect at least one of the short circuit to the ground and the short circuit to the power supply of the signal line for the at least one of the detection signals, and for outputting the detection-line malfunction detection signal.

* * * * *